US012544446B2

United States Patent
Kaiserman et al.

(10) Patent No.: US 12,544,446 B2
(45) Date of Patent: Feb. 10, 2026

(54) PRINTED DELIVERY DEVICE HAVING SUPPLEMENTS

(71) Applicant: Vitiprints, LLC, New York, NY (US)

(72) Inventors: Terrance Kaiserman, Loxahatchee, FL (US); Roosey Khawly, New York, NY (US); Andrew Ferber, New York, NY (US); John Gentile, Montclair, NJ (US)

(73) Assignee: Vitiprints, LLC, New York, NY (US)

( * ) Notice: Subject to any disclaimer, the term of this patent is extended or adjusted under 35 U.S.C. 154(b) by 950 days.

(21) Appl. No.: 17/536,958

(22) Filed: Nov. 29, 2021

(65) Prior Publication Data

US 2022/0080050 A1    Mar. 17, 2022

Related U.S. Application Data

(63) Continuation-in-part of application No. 16/291,697, filed on Mar. 4, 2019, now abandoned.

(60) Provisional application No. 62/637,829, filed on Mar. 2, 2018.

(51) Int. Cl.
| | |
|---|---|
| A61K 47/36 | (2006.01) |
| A61K 47/10 | (2017.01) |
| A61K 47/24 | (2006.01) |
| A61K 47/26 | (2006.01) |
| A61K 47/38 | (2006.01) |
| A61K 47/46 | (2006.01) |
| C09D 11/033 | (2014.01) |
| C09D 11/14 | (2006.01) |

(52) U.S. Cl.
CPC .............. *A61K 47/36* (2013.01); *A61K 47/10* (2013.01); *A61K 47/24* (2013.01); *A61K 47/26* (2013.01); *A61K 47/38* (2013.01); *A61K 47/46* (2013.01); *C09D 11/033* (2013.01); *C09D 11/14* (2013.01)

(58) Field of Classification Search
None
See application file for complete search history.

(56) References Cited

U.S. PATENT DOCUMENTS

| | | | |
|---|---|---|---|
| 5,620,757 A | 4/1997 | Ninomiya et al. | |
| 5,629,003 A | 5/1997 | Horstmann et al. | |
| 6,106,930 A | 8/2000 | Ludwig | |
| 6,274,162 B1 | 8/2001 | Steffenino et al. | |
| 6,280,771 B1 | 8/2001 | Monkhouse et al. | |
| 6,913,766 B1 | 7/2005 | Krumme et al. | |
| 6,962,715 B2 | 11/2005 | Lee et al. | |
| 7,037,526 B1 | 5/2006 | Krumme et al. | |
| 7,357,891 B2 | 4/2008 | Yang et al. | |
| 7,666,337 B2 | 2/2010 | Yang et al. | |
| 7,727,576 B2 | 6/2010 | Figueroa et al. | |
| 7,807,194 B2 | 10/2010 | Modliszewski et al. | |
| 7,842,319 B2 | 11/2010 | Baydo et al. | |
| 7,850,994 B1 | 12/2010 | Ducheyne et al. | |
| 7,897,080 B2 | 3/2011 | Yang et al. | |
| 8,167,990 B2 | 5/2012 | De Saint-Romain | |
| 8,454,989 B2 | 6/2013 | Lee et al. | |
| 8,581,134 B2 * | 11/2013 | Politi | A61J 3/10 209/127.4 |
| 8,603,514 B2 | 12/2013 | Yang et al. | |
| 8,652,378 B1 | 2/2014 | Yang et al. | |
| 8,758,803 B2 | 6/2014 | Muller et al. | |
| 8,900,497 B2 | 12/2014 | Yang et al. | |
| 8,900,498 B2 | 12/2014 | Yang et al. | |
| 8,905,236 B2 | 12/2014 | Denome et al. | |
| 8,906,277 B2 | 12/2014 | Yang et al. | |
| 8,956,685 B2 | 2/2015 | Bogue et al. | |
| 9,084,731 B2 | 7/2015 | Krumme et al. | |
| 9,108,340 B2 | 8/2015 | Yang et al. | |
| 9,198,875 B2 | 12/2015 | Smith et al. | |
| 9,211,267 B2 | 12/2015 | Krumme et al. | |
| 9,339,489 B2 | 5/2016 | Jacob et al. | |
| 9,393,217 B2 | 7/2016 | Hammond et al. | |
| 9,394,092 B2 | 7/2016 | Lee et al. | |
| 9,545,376 B2 | 1/2017 | Musho et al. | |
| 9,616,018 B2 | 4/2017 | Jacob et al. | |
| 9,662,297 B2 | 5/2017 | Musho et al. | |
| 9,669,009 B2 | 6/2017 | Jacob et al. | |
| 9,901,545 B1 | 2/2018 | Fuisz et al. | |
| 9,931,305 B2 | 4/2018 | Yang et al. | |
| 9,937,123 B2 | 4/2018 | Barnhart et al. | |
| 2004/0096498 A1 * | 5/2004 | Kershman | A61K 9/5047 424/468 |

(Continued)

FOREIGN PATENT DOCUMENTS

| | | | |
|---|---|---|---|
| CA | 2869450 A1 * | 10/2013 | ........... A61K 31/485 |
| CN | 1747656 A | 3/2006 | |

(Continued)

OTHER PUBLICATIONS

CN-104546806-A, Diao Y, Apr. 29, 2015, English translation (Year: 2015).*
KR 101407922 B1, Oh Dong Hoon, Jun. 7, 2014, English translation (Year: 2014).*
UA 60703 C2, Kordium Vitalii Arnoldovych, Jan. 16, 2006, English translation (Year: 2006).*
WO-2010151020-A2, Gyu Park J, Dec. 29, 2010, English translation (Year: 2010).*
International Search Report and Written Opinion issued in Appln. No. PCT/US2022/051068 Mailed Mar. 31, 2023 (12 pages).
Cader et al., "Water-based 3D inkjet printing of an oral pharmaceutical dosage form", International Journal of Pharmaceutics, Apr. 2019, vol. 564, pp. 359-368, XP085689547.

(Continued)

*Primary Examiner* — Frederick F Krass
*Assistant Examiner* — Ashlee E Wertz
(74) *Attorney, Agent, or Firm* — Lerner David LLP

(57) ABSTRACT

Printed delivery devices are disclosed herein. The printed delivery devices may include a layer formed from a water-soluble, printable composition. The water-soluble, printable composition may include purified water, pullulan, and vegetable glycerin. The printed delivery device may also include a support substrate made from polyester and/or polyolefin. The first layer may be printed on the support substrate.

20 Claims, 16 Drawing Sheets

(56) References Cited

U.S. PATENT DOCUMENTS

| | | |
|---|---|---|
| 2004/0096569 A1* | 5/2004 | Barkalow .............. A23L 27/79 426/660 |
| 2004/0247744 A1 | 12/2004 | Pearce et al. |
| 2007/0132823 A1 | 6/2007 | Barreto et al. |
| 2007/0231435 A1* | 10/2007 | Ream ...................... A23G 3/28 426/383 |
| 2007/0237871 A1 | 10/2007 | Furusawa |
| 2008/0260807 A1 | 10/2008 | Sharp et al. |
| 2009/0196908 A1 | 8/2009 | Lee et al. |
| 2010/0062258 A1 | 3/2010 | Takeoka et al. |
| 2012/0225100 A1 | 9/2012 | Darcy et al. |
| 2012/0315333 A1 | 12/2012 | Zhou et al. |
| 2013/0034633 A1 | 2/2013 | von Hasseln |
| 2014/0105958 A1 | 4/2014 | Ntoya |
| 2014/0113042 A1 | 4/2014 | Sung et al. |
| 2014/0154378 A1 | 6/2014 | von Hasseln et al. |
| 2014/0186427 A1 | 7/2014 | Breitenbach et al. |
| 2014/0248246 A1 | 9/2014 | Kuslys |
| 2014/0271783 A1 | 9/2014 | Pinal et al. |
| 2014/0335153 A1 | 11/2014 | Allen et al. |
| 2015/0136637 A1 | 5/2015 | Meier et al. |
| 2015/0210969 A1 | 7/2015 | Brandt-Sanz et al. |
| 2015/0250739 A1 | 9/2015 | DeMuth et al. |
| 2015/0360837 A1 | 12/2015 | Perez-Prat Vinuesa et al. |
| 2016/0051510 A1 | 2/2016 | Allen et al. |
| 2016/0101108 A1 | 4/2016 | Sandler et al. |
| 2016/0192673 A1 | 7/2016 | Fielding et al. |
| 2016/0193157 A1 | 7/2016 | Topolkaraev et al. |
| 2016/0330992 A1 | 11/2016 | Von Hasseln et al. |
| 2016/0346225 A1 | 12/2016 | Pinal et al. |
| 2016/0361335 A1 | 12/2016 | Jacob et al. |
| 2017/0020182 A1 | 1/2017 | Schmidt et al. |
| 2017/0071871 A1 | 3/2017 | Yang et al. |
| 2017/0172919 A1 | 6/2017 | Jacob et al. |
| 2017/0202807 A1 | 7/2017 | Jacob et al. |
| 2017/0246108 A1 | 8/2017 | Musho et al. |
| 2017/0258763 A1 | 9/2017 | Jacob et al. |
| 2017/0259976 A1 | 9/2017 | Lee et al. |
| 2017/0281560 A1 | 10/2017 | Daya et al. |
| 2017/0290777 A1 | 10/2017 | Yang et al. |
| 2017/0290870 A1* | 10/2017 | Schaneville ........... A61K 9/107 |
| 2017/0340520 A1 | 11/2017 | Heo et al. |
| 2018/0057776 A1 | 3/2018 | Brandt Sanz |
| 2018/0103677 A1 | 4/2018 | Smith et al. |
| 2018/0104183 A1 | 4/2018 | Kawamura et al. |
| 2020/0113210 A1 | 4/2020 | Kaiserman et al. |

FOREIGN PATENT DOCUMENTS

| | | | | |
|---|---|---|---|---|
| CN | 104546806 A | * | 4/2015 | |
| EP | 3847102 A1 | | 7/2021 | |
| KR | 101407922 B1 | * | 6/2014 | |
| UA | 60703 C2 | * | 1/2006 | |
| WO | WO-2010151020 A2 | * | 12/2010 | ............. A61K 31/09 |
| WO | 2014188079 A1 | | 11/2014 | |
| WO | WO-2016014509 A1 | * | 1/2016 | ............. A23L 33/10 |
| WO | WO-2016172699 A1 | * | 10/2016 | ............. A23P 20/25 |
| WO | 2019198105 A1 | | 10/2019 | |
| WO | 2021045742 A1 | | 3/2021 | |

OTHER PUBLICATIONS

International Search Report including the Written Opinion from Application No. PCT/US2019/049517 mailed May 8, 2020, 15 pages.

International Search Report including the Written Opinion from Application No. PCT/US2019/049601 mailed May 8, 2020, 17 pages.

Scoutaris et al., "Jet dispensing of multi-layered films for the co-delivery of three antihypertensive agents", Drug Delivery and Translational Research, Oct. 2017, vol. 8, No. 1, pp. 32-42, XP036414693.

Wickstrom et al., Colorimetry as Quality Control Tool for Individual Inkjet-Printed Pediatric Formulations, Oct. 13, 2016, AAPS PharmSciTech, vol. 18, No. 2, pp. 293-302 (Year: 2016).

Wickstrorn et al., "Inkjet Printing of Drug-Loaded Mesoporous Silica Nanoparticles: A Platform for Drug Development", 2017, Molecules, vol. 22, pp. 1-20. (Year: 2017).

Cader, et al., Water-Based 3D Inkjet Printing of an Oral Pharmaceutical Dosage Form, Hatim K et, International Journal of Pharmaceuticas, vol. 564, pp. 359-368 (Apr. 2019).

United Arab Emirates Search Report for UAE Application No. P6000394/2022, dated Oct. 7, 2024, 2 pages.

* cited by examiner

PRINTED DELIVERY DEVICE HAVING SUPPLEMENTS

CROSS-REFERENCE TO RELATED APPLICATIONS

This application is a continuation-in-part of U.S. patent application Ser. No. 16/291,697 filed Mar. 4, 2019, which claims the benefit of the filing date of U.S. Provisional Patent Application No. 62/637,829 filed Mar. 2, 2018, the disclosures of which are all incorporated by reference.

BACKGROUND OF THE INVENTION

Conventional delivery devices for supplements, such as tablets, capsules, soft gels, pills, etc., are typically formed from, or include, a mixture of a supplement or supplements with additional materials. These additional materials, such as fillers and excipients enable the supplement within the conventional delivery devices to flow and dissolve when subjected to the appropriate conditions, such as after consumption or placement with a liquid. However, the addition of these additional materials to the conventional delivery devices detracts from the overall purity of the supplement or supplements contained therein.

The additional materials add bulk (e.g., mass, weight, length, width, and/or depth,) to the conventional delivery device, increase manufacturing time, and increase manufacturing cost. In this regard, each additional material used in manufacturing a conventional delivery device adds mass to the completed delivery device, requires additional time to incorporate into the completed delivery device, and results in additional costs to cover the additional materials as well as to cover the increase in manufacturing time.

Many supplements are incapable of being blended together within a single conventional delivery device. For instance, supplements, such as a water-soluble supplement and a non-water soluble supplement are often immiscible. In addition, interactions, such as chemical reactions, between different supplements may result in the degradation of one or more of the supplements contained therein, which in turn may result in a less efficacious dosage. As such, combinations of supplements that are incapable of being blended and/or result in the degradation of one or more of the supplements may need to be separated into distinct, conventional delivery devices.

BRIEF SUMMARY OF THE INVENTION

The technology is related to a printed delivery device.

One aspect of the technology is directed to a printed delivery device, comprising: a first layer formed from a water-soluble, printable composition, the water-soluble, printable composition including between 25-55% purified water by weight, between 1-10% pullulan by weight, and 2-12% vegetable glycerin by weight.

In some instances, the water-soluble, printable composition further includes between 40-50% milk powder by weight.

In some instances, the water-soluble, printable composition further includes between 3-12% cane sugar by weight, between 1-4% cellulose fiber by weight, between 20-30% tapioca starch, by weight, between 2-8% stevia by weight, and between 0.25-3% sunflower lecithin by weight.

In some examples, the water-soluble, printable composition further includes between 1-4% sodium alginate by weight, between 10-20% cluster dextrin by weight, between 5-15% stevia by weight, between 2-5% sucralose by weight, and between 3-10% vanilla by weight.

In some examples, the water-soluble, printable composition further includes between 1-3% sodium alginate by weight, between 10-20% cluster dextrin by weight, between 5-15% stevia by weight, between 2-5% sucralose by weight, and between 3-8% French vanilla by weight.

In some instances, the water-soluble, printable composition further includes between 3-10% xylitol by weight, between 1-8% cluster dextrin by weight, between 25-45 tapioca starch by weight, between 0.25-3% sunflower lecithin by weight, between 3-8% cane sugar by weight, and between 2-5% D3 powdered oil by weight.

In some instances, the water-soluble, printable composition further includes between 0.25-2% milk by weight, between 5-11% xylitol by weight, between 10-20% tapioca starch by weight, between 5-9% oat fiber by weight, and between 5-9% foamex by weight.

In some examples, the water-soluble, printable composition further includes between 0.25-2% milk by weight, between 5-11% xylitol by weight, between 10-20% tapioca starch by weight, between 5-9% oat fiber by weight, between 5-9% foamex by weight, and between 0-5% colorant by weight.

In some instances, the printed delivery device includes a second layer formed of a second printable composition including at least one second supplement or pharmaceutical. In some examples, the second layer is formed on the first layer.

In some instances, the printed delivery device includes a support substrate. In some examples, the support substrate comprises polyester and/or polyolefin. In some examples, the support substrate is dissolvable in liquid. In some examples, the first layer is printed on the support substrate. In some examples, the support substrate and the first layer are uniform in size.

In some instances, the first layer includes micro-scoring or pinholes.

In some instances, the water-soluble, printable composition further includes one or more of a vitamin, mineral, protein, probiotic, fiber, amino acid, CBD oil, THC oil, or Hemp oil.

In some instances, the water-soluble, printable composition further includes a binder, wherein the binder includes one or more of a polysaccharide, ethyl cellulose, polyacrylic acid, methyl cellulose, polyethylene oxide, guar gum, xanthum gum, gum Arabic, polyvinyl alcohol, sodium alginate, water-soluble hydroxypropylmethyl cellulose, hydroxyethyl cellulose, hydroxypropyl cellulose, polyvinyl pyrrolidone, carboxymethyl cellulose, sodium carboxy methyl cellulose, methyl cellulose, polyvinyl alcohol, xanthum gum, corn starch, or rice starch.

In some instances, the water-soluble, printable composition further includes a flow aid, wherein the flow aid is one or more of glycols, polyglycols, xylitol, or glycerol.

Another aspect of the disclosure is directed to a printed delivery device, comprising: a first layer formed from a water-soluble, printable composition, the water-soluble, printable composition including between 25-55% purified water by weight, between 1-10% pullulan by weight, and 2-12% vegetable glycerin by weight; and a support substrate, wherein the first layer is formed on the support substrate.

Another aspect of the disclosure is directed to a method of forming a printed delivery device. The method may include selecting a stencil, placing the stencil onto a support substrate, depositing ink onto the selected stencil, and sliding a squeegee over the stencil to spread the ink.

In some examples, the stencil is constructed from stainless steel, wherein the stainless steel is medical grade.

In some examples, the stainless steel has a thickness between 1/10 of an inch to 3/80 of an inch.

In some examples, the stencil includes one or more voids.

In some examples, the squeegee forces the ink into the one or more voids.

In some examples, the ink is deposited directly into the one or more voids. In some examples, the squeegee runs along a top surface of the stencil, including over the one or more voids.

In some examples, the stencil is polished.

In some examples, for each of the one or more voids, an area where the respective void meet the top surface of the stencil may be rounded.

In some examples, the squeegee may have a bullnose or a straight edge tip.

In some embodiments, the squeegee may be made of 60, 70, or 80 durometer polyurethane. In some examples, the polyurethane may be medical grade and FDA approved.

In some instances, the printed layers of ink may be heated in an oven after being printed. In some examples, the printed layers of ink and the support substrate may be placed on a tray and inserted into a batch oven. In some examples, the substrate and printed layers of ink may be placed on a conveyor of a conveyor oven and conveyed through the conveyor oven.

In some examples, the printed layers of ink and the support substrate may be heated between 30 seconds to 15 minutes in heat ranging from 100-350 F, or preferably between 1 minute and 10 minutes in heat ranging from 150-300 F, or more preferably between 2-5 minutes between 200-250 F.

In some embodiments, the stencil may be removed from the support substrate prior to heating.

In one aspect of the technology the printed delivery device comprises a first layer formed of a printable composition including at least one first supplement; a second layer formed of a second printable composition including at least one second supplement; and wherein the second layer is disposed on the first layer. In some embodiments the printed delivery device of includes a support substrate.

In some instances the at least one second supplement is different from the at least one first supplement. In some embodiments the at least one second supplement is the same as the at least one first supplement.

In some embodiments the support substrate encompasses the at least one of the first or second layer. In some instances the first layer is disposed on the support substrate.

In another aspect of the technology the printed delivery device comprises a support substrate; a first printed composition, including a first supplement, coated onto the support substrate; a second printed composition disposed on the first printed composition; and a decorative film applied to one or more of the first printed composition, second printed composition, or the support substrate.

In some instances the support substrate is polyester.

In some instances the first supplement is a probiotic. In some instances the second printed composition includes a second supplement. The second supplement is a vitamin, in some embodiments.

In some embodiments the decorative film is applied with lamination.

In some aspects of the technology the printed delivery device can include a multilayer stack, for instance, having one supplement in a first layer, and one or more additional supplements in one or more layers overlying the first layer. The layers of the multilayer stack can, in some embodiments, have layers with varied doses of a supplement. The layers, in some embodiments, can be different colors to identify an ingredient and/or dosage.

DETAILED DESCRIPTION

Figure 1A:
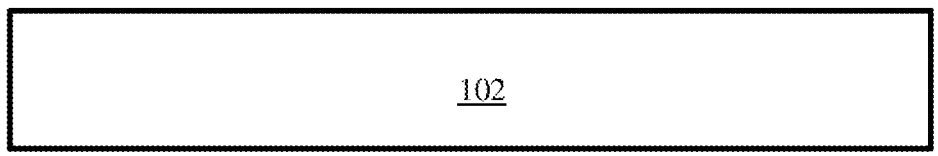
FIG. 1A depicts a schematic view of a printed delivery device in accordance with some embodiments of the present application.

The invention relates to printed delivery devices formed of one or more layers of printed compositions, such as films, and methods of making them. As described above, conventional delivery devices, such as pills and capsules, typically require the use of additional materials which detracts from the purity of the supplement, as well as adding bulk and manufacturing costs to the conventional delivery device. Moreover, conventional delivery devices are limited as to the combinations of supplements they can offer. In this regard, certain combinations of supplements are immiscible and some combinations of supplements may result in the degradation of one or more of the supplements. This can create a situation where the efficacy of the supplements is diminished or ineffective. It may also require multiple conventional delivery devices to deliver the desired supplements.

To address these issues, printed delivery devices may be formed from one or more layers of printed composition. Each layer may contain a supplement or grouping of interacting and/or non-interacting supplements. Each supplement within a layer may be of a predetermined dose. The printed delivery devices may be utilized in applications where a supplement may be desirable, for example, as an additive to a food or beverage for the purpose of nutrition, flavor, sweetening, medicinal ingestion, and the like.

The printed delivery device may be configured such that it is shelf-stable. In this regard, printed compositions may be configured with a moisture barrier, such that the printed composition, and the supplements therein, are unaffected by room humidity and moisture levels within a certain threshold. Moreover, the layers of printed composition may be arranged such that the printed delivery device is of a particular size and shape. The size and shape of each printed delivery device may be tailored depending upon its intended use, its packaging, and/or its shipping method. For instance, the layers of a printed delivery device may be printed in a rectangular shape, such that the printed delivery device is rectangular and capable of being positioned within a box for flat shipping.

The dissolution or dispersal rate of each layer of printed compositions may be controlled. In this regard, the printed compositions of a printed delivery device may be tailored to have individual time release profiles. For instance, a first layer containing a supplement can dissolve at a faster rate than a second layer containing a second supplement to allow ingestion of the first supplement prior to the second supplement. More particularly, an ingestible printed delivery device containing a first layer having a pleasant tasting supplement and a second layer having an unpleasant tasting supplement, may be configured such that the first layer dissolves prior to the second layer. As such, the pleasant tasting supplement may bind to tongue receptors prior to the unpleasant tasting supplement dissolving, thereby blocking or masking the taste of the unpleasant supplement.

Figure 1B:
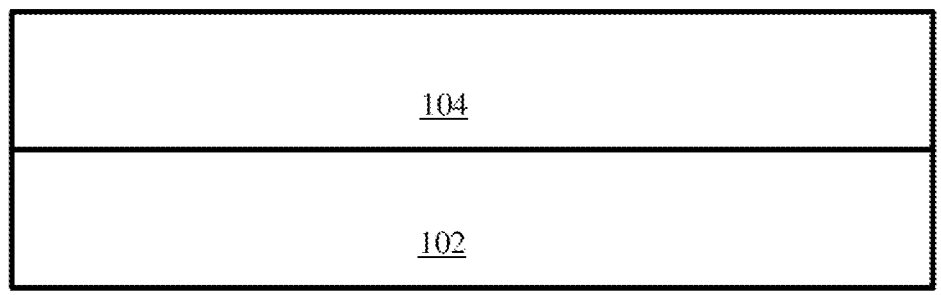
FIG. 1B depicts a schematic view of a printed delivery device having two layers of printed compositions in accordance with some embodiments of the present application.

A printed delivery device may include one or more layers comprised of printed compositions. FIG. 1A depicts one exemplary embodiment of a printed delivery device 100 including a first layer 102 of printed composition. FIG. 1B depicts another exemplary embodiment of a printed delivery device 110 which includes two layers, including first layer 102 comprised of a printed composition and second layer 104 comprised of a printed composition, such as a film. Although only two layers are shown in FIG. 1B, any number of layers may be present.

Each layer may include active or inactive ingredients. In this regard, the printed composition may be comprised of active ingredients, such as one or more supplements or pharmaceuticals. For instance, referring again to FIG. 1B, first layer 102 may be comprised of a printed composition containing a first supplement and second layer 104 may be comprised of another printed composition including a second supplement. Although the first layer 102 and second layer 104 are disclosed as containing active ingredients, they may contain inactive ingredients and/or a combination of active and inactive ingredients. Moreover, each layer may contain the same or different active and inactive ingredients. Layers having active ingredients may be referred to as active layers.

The active ingredients may include supplements and the supplements may include those suitable for nutrition, flavor enhancement, and/or medicinal purposes that can be ingested. Nutritional supplements can include a vitamin, a mineral, a protein, a probiotic, a fiber, an amino acid, and other dietary supplements. For example, vitamins may include any suitable vitamin that can be ingested, such as vitamin A, B, C, D, E, B12, and the like found in a typical over the counter multivitamin. Minerals may include iron, magnesium, potassium, and the like found in a typical over the counter multivitamin. A protein may include whey protein or a plant based protein. In some instances, the active and inactive ingredients may include pharmaceuticals, such as acetylsalicylic acid, acetaminophen, ibuprofen, etc., as well as beverage and food items.

In order to incorporate active and inactive ingredients into the printed composition, the active ingredients may be microencapsulated, dispersed, suspended and/or solubilized into a printable composition, such as carrageenan, xanthum gum, guar gum, or other such material. In some instances, a small amount of preservative, such as ascorbic acid may be included in the composition.

The printable composition may include additional components to alter the properties of the printed delivery device. Such properties may include the following: Structural support of the printed composition; release control of an active ingredient, such as a supplement from the printed composition as it dissolves and/or disperses; shelf stability of the active ingredient; manipulation of the printable composition or formed printed composition during manufacture; appearance of the printed delivery device; and taste of the printed delivery device.

For instance, the printable composition may be configured such that the dissolution or dispersion of the active or inactive ingredients within the printable composition may be released over a period of time. For instance, additional components such as starches may be mixed with one or more of polyvinyl alcohol, polysaccharides (e.g., Pullulan), sodium alginate, etc., and into one or more of the materials for generating the printable composition such as, carrageenan, xanthum gum, guar gum, etc.

The period of dissolution or dispersion may be adjusted based on the amount of starch, such as a slower period of dissolution or dispersion when more starch is used and quicker dissolution or dispersion when less starch is used (or vice versa). In some instances a binder may be added to the printable composition to maintain the structural integrity of the substances therein. Binders may include one or more of polysaccharides (e.g., Pullulan,) sodium alginate, etc. In some instances, the entire printed delivery device and/or individual layers of the printed delivery device may include be subjected to micro-scoring and/or pinholes. By doing such, the surface area of the printed delivery device and/or layers is increased, thereby allowing for faster dissolution/ dispersion.

Other additional components in the printable composition can include one or more of polymers, defoamers, flow aides, flavor enhancers, rheological modifiers, humectants, waxes, and the like and other components that are utilized to print a layer from an ink, such as dyes, pigments, etc. Exemplary polymers may be water soluble, water swellable or water insoluble. They may include but are not limited by, ethyl cellulose, polyacrylic acid, methyl cellulose, polyethylene oxide, guar gum, xanthum gum, gum Arabic, polyvinyl alcohol, sodium alginate, water-soluble hydroxypropylmethyl cellulose, hydroxyethyl cellulose, hydroxypropyl cellulose, polyvinyl pyrrolidone, carboxymethyl cellulose, sodium carboxy methyl cellulose, methyl cellulose, polyvinyl alcohol, xanthan gum, various starches such as corn starch, rice starch etc.

Defoamers may include, but are not limited thereto, alcohol or polysiloxane type defoamers both in water and alcohol. Flow aids may contain food grade glycols and polyglycols, xylitol, glycerol.

Waxes may include, but are not limited thereto, paraffin or carnauba waxes.

Humectants may include, but are not limited thereto, all molecular weight polyethylene glycols and propylene glycols, xylitol, glycerol sugars and starches. Rheology modifiers may include, but are not limited thereto, sodium salts of an acrylic polymer, various starches and gums.

Colorants may also be used to tint printed compositions to specific colors. In this regard, each layer may include its own color or the same color.

Each layer can be tailored to the particular needs of an application. For example, a layer that is self-supporting (e.g. as shown in FIG. 1A) may include, in addition to one or more supplements, components such as one or more high glass transition (Tg) PVOH, PVA, sodium alginate, polysaccharides, wax, or starch that is stiff but which will dissolve quickly upon contact with a predetermined amount of moisture, such as upon contact with a beverage and/or saliva.

Alternatively, a layer that is deposited or encapsulated on a support substrate (as described in further detail herein,) may have a different composition where the printed composition does not need to provide its own support. For example, such a layer having an active ingredient may include, in addition to one or more supplements, a food grade thickening system such as xanthum gum. Further, the layer could be printed on a support substrate that includes strong structural support from the inclusion of materials such as wax and/or sodium alginate, PVOH, PVA. In some instances, multiple layers of one or more of the same supplements may be used to increase the dosage of a single printed delivery device.

In the preceding exemplary embodiments, each layer of the respective printed delivery devices may be sufficiently robust in terms of shelf stability and/or mechanical stability such that the layers do not require a support substrate to improve or provide these properties. In other words, layers comprised of films having sufficient rigidity and/or additional components may obviate the need for a support substrate. For example, a supplement and/or additional component in the layer that has a high glass transition can allow for a more rigid layer which has sufficient stiffness to handle and/or orally ingest and/or place in a food product, such as a beverage, without sagging to a degree that makes handling difficult.

Figure 2A:
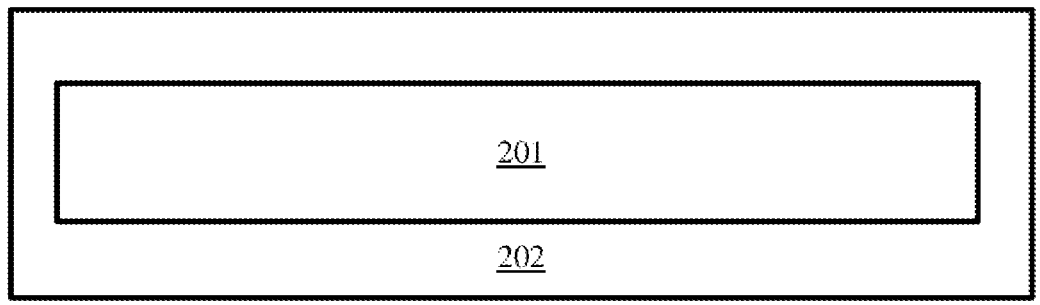
FIG. 2A depicts a schematic view of a printed delivery device having a support substrate around a layer of printed compositions in accordance with some embodiments of the present application.

Printed delivery devices may include a support substrate. The support substrate, also referred to as a support structure, may provide a supportive base on which one or more layers of printed composition may be positioned. In this regard, the one or more layers of the printed delivery device may not be capable of maintaining their shape and/or supporting their own weight. As such, during handling, storing, and/or transportation the one or more layers may break apart or otherwise deform, and/or sag. To prevent this from occurring, a support substrate may be used to provide structural support to layers disposed therein. For instance, FIG. 2A depicts one exemplary embodiment of a printed delivery device 200 including a support substrate 202 encompassing the first layer 201. In some instances, support substrates may be used for printed delivery devices even if they are capable of maintaining their shape and/or supporting their own weight. The substrate could be an alginate.

Figure 2B:
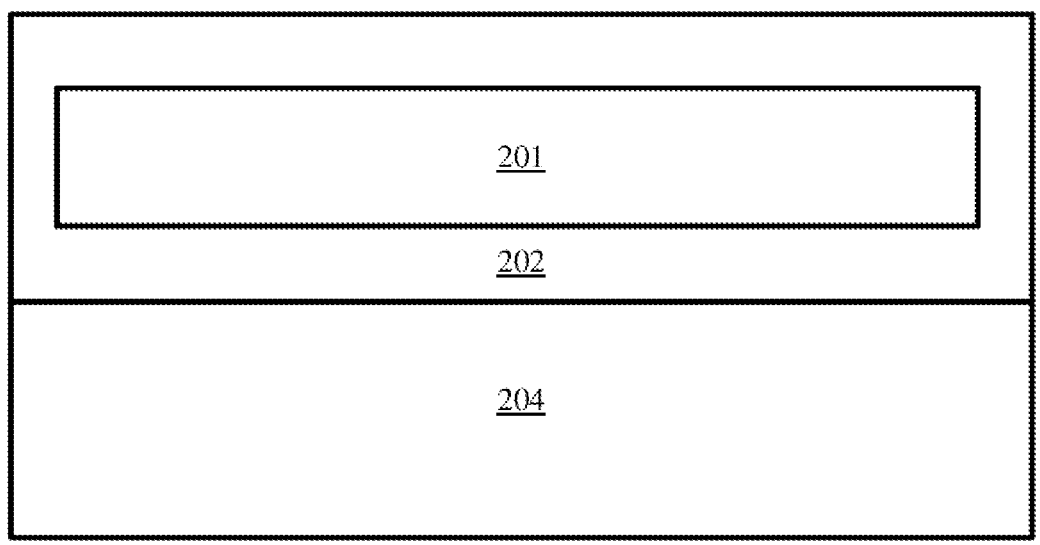
FIG. 2B depicts a schematic view of a printed delivery device having a support substrate around a layer of printed composition disposed on a second layer of printed compositions in accordance with some embodiments of the present application.

Another exemplary embodiment of a printed delivery device including a support structure is shown in FIG. 2B. In this embodiment the printed delivery device 210 includes a first layer 201 completely encapsulated by the support substrate 202. A second layer 204, which may be, on its own, structurally sound, is disposed on a surface of the support substrate 202, such that the second layer 204 is not encapsulated by the support substrate 202. In instances where the second layer 204 does not require structural support, a smaller support structure 202 may be used in the printed delivery device 210. As such, the amount of material to produce the support structure 202 may be reduced.

Figure 2C:
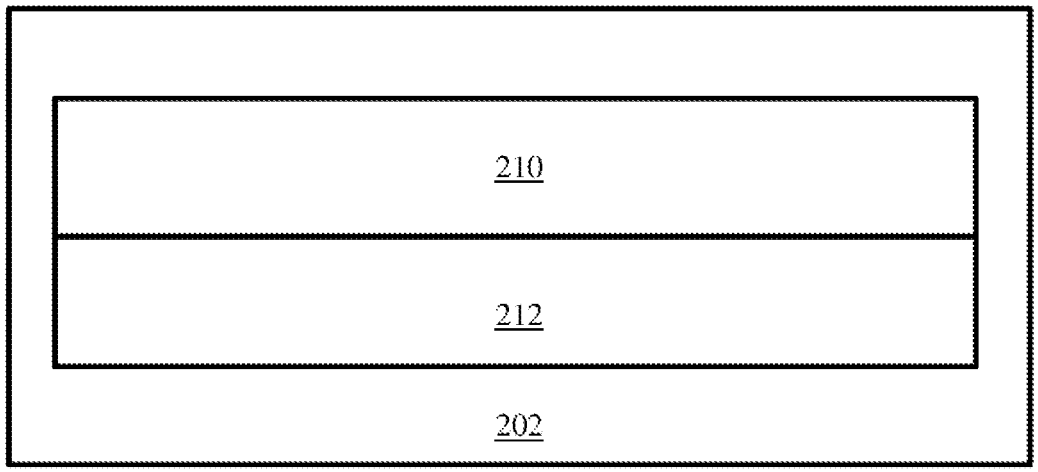
FIG. 2C depicts a schematic view of a printed delivery device having a support substrate around multiple layers of printed compositions in accordance with some embodiments of the present application.

In contrast with the embodiment of FIG. 2B, FIG. 2C shows a printed delivery device 220 which has two layers 210 and 212 fully encapsulated by a support structure 202.

Figure 2D:
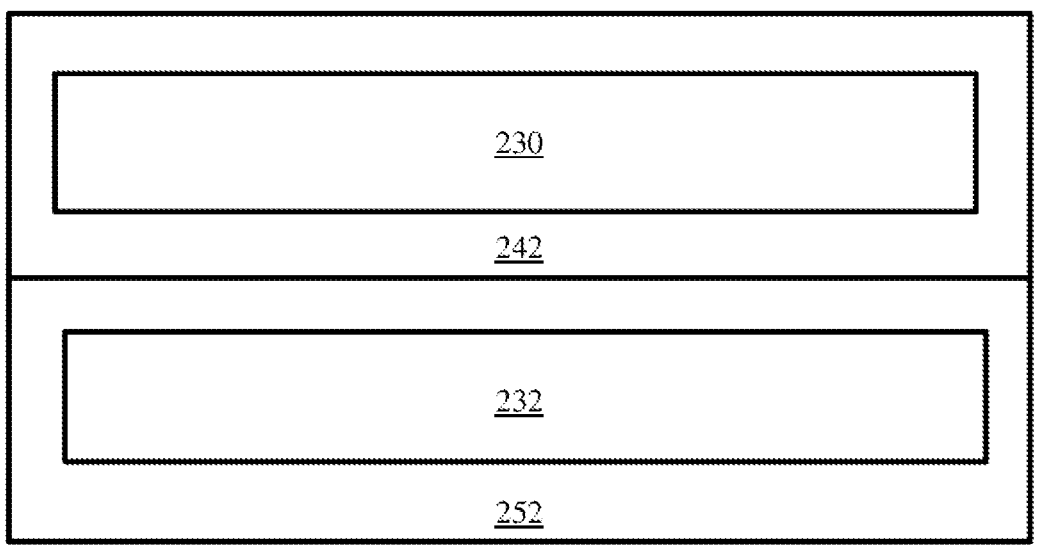
FIG. 2D depicts a schematic view of a printed delivery device having multiple support substrates in accordance with some embodiments of the present application.

FIG. 2D depicts yet another exemplary embodiment of a printed delivery device 230 including the first layer 230 encapsulated by a first support substrate 242 and the second layer 232 encapsulated by a second support substrate 252. The support substrate 242 may be suitable to meet the shelf life and/or time release criteria of the first layer 230, which may include one or more active ingredients, second layer 232, which many include one or more active ingredients, and the second support substrate 252 may be suitable to meet the shelf life and/or time release criteria of the second layer 232.

Although some of the support structures of the above embodiments (e.g., FIGS. 2B-2D,) are shown as fully encapsulating one or more layers, a layer may be deposited or otherwise positioned on support substrate, or vice-versa. As such, only a portion or portions of a layer may be disposed on a support structure. Further, a layer may be encapsulated or disposed on more than one support substrate. For instance, a layer may be disposed between support substrates, i.e., one support substrate atop active layer, and another support substrate below the layer.

The support structure may be comprised of a printed composition and/or any of the other additional components described herein. In this regard, the support substrate may be dissolvable or non-dissolvable. In certain embodiments the support structure may be comprised of a dissolvable film, such as manufactured by Aquapak, Monosol, Nippon-gohsei, etc. A release liner or paper may be used as a support substrate. As used herein, a release paper is a paper with a release agent coated to allow a layer(s) formed thereon to be released from the paper. A release liner may be paper, polyester, plastic, or other such material with or without a release agent coating, which allows a layer(s) formed thereon to be released.

In addition to, or apart from providing structural support, the support substrate may be configured to provide a protective layer to maintain shelf stability of the printed delivery device, control release of the layers, and/or provide a packaging for the printed delivery device. In this regard, the support substrate can be tailored to the particular need of the application of the printed delivery device. For instance, when the support substrate is to function as a barrier layer to moisture and/or, in some instances as a packaging material, the support substrate may include wax, polyester, silicone, and desiccants, such as rice starch or other starches which block a predetermined amount of moisture from reaching layers encompassed by the support substrates (although such materials may be used even in other configurations of the support structure). In one exemplary embodiment, the support substrate could be two or more layers, such as a hydrophobic layer and a desiccant layer. In this regard, hydrophobic layer may overly the desiccant layer which is closed to the layer. In operation, the hydrophobic layer limits moisture vapor transmission to the layers encompassed by the support substrate. However, should there be a hole or defect in the hydrophobic layer, the desiccant layer can absorb moisture that gets through the hydrophobic layer. The support substrate, although hydrophobic, may still dissolve when immersed in a certain amount of liquid, such as a beverage or in a user's mouth upon ingestion.

In some instances, the support substrate may be a hydrophobic coating to ensure that the surface of the active layer does not get tacky. For instance, polyvinyl alcohol (PVOH), starch, and/or other edible and safe binders can be modified to give the desired surface feel, dissolution rates and taste profiles necessary to make a stable product that can go through normal handling.

Where the printed delivery device is to be operated in certain environments, such as sub-freezing temperatures, some of the layers can be brittle. As such, the support structure, such as a release paper or release liner, may be configured to prevent the layers from breaking or otherwise becoming deformed. In some instances, where the support structure is printed, the ink used to print the support structure may be configured to withstand the extreme temperatures. For example, a release liner may be interleafed between individual printed delivery devices to form a container. In another example, ink which includes constituents which have a low glass transition (Tg) may be used to allow the ink to be able to withstand exposure to lower temperatures. In this regard, ingredients, such as powders, would not be affected by those temperatures. Other liquid ingredients, which may be free of water that would crystallize, would be of high enough purity to withstand lower temperatures. In the case of higher temperatures of below 200 F, or more or less, adjustments to the we would make the same choices. Please keep in mind that we balance the ingredients to go through both extremes. Think chocolate. If it melts in high temperatures, it solidifies when the temperature drops. The disks have similar characteristics.

Similar to the controlled release of the layers, described above, the support substrate may be configured such that the dissolution or dispersion of the support substrate may be performed over a period of time. In this regard, additional components such as starches may be mixed with polyvinyl alcohol and into one of the materials for generating the printable support substrate such as carrageenan, xanthum gum, guar gum, etc. The period of dissolution or dispersion may be adjusted by adjusting the formulation of the composition. For instance, based on the ingredients contained in the composition, such as the amount starch, the dissolution or dispersion rate may be adjusted. In one such example, a slower period of dissolution or dispersion may occur when more starch is used and quicker dissolution or dispersion when less starch is used. In some instances a binder may be added to the printable composition to maintain the structural integrity of the substances therein. In some instances, the support substrate may include supplements or other active ingredients.

The printed delivery device may be arranged in various dispensing configurations. For example, one dispensing configuration may be a continuous tape with or without perforations for tearing. In some instances the continuous tape arrangement of the printed delivery device may be placed in a tape dispenser type device, where a portion of the strip may be torn off with the assistance of a cutting blade. In the continuous tape arrangement, a support substrate, such as release paper may support and or enclose one or more active layers.

In another exemplary embodiment, the printed delivery device may be printed on a release paper in the form of dots, small particles, granules, or the like. The printed delivery device may be removed from the release paper. In instances where the printed delivery device is formed on a printed support substrate, no release paper may be required. Rather, the printed delivery device may be stored in a dispenser such as a dispenser with openings similar manner to that of a salt shaker. Other dispensing configurations may include stacking the printed delivery device on top of each other, such as similar to Pez from a Pez dispenser, or packaging the printed delivery device in a pouch or sealed packaging, such as like an individual Band-Aid. Packaging for dispensing may also be printed and/or individualized, for example, with a person's name. Also, a support substrate may allow for multiple dosages (e.g., portioned layer(s) of active ingredients,) to be attached to one sheet of a support substrate to carry multiple dosages on one sheet instead of individual dosages that are packed loose.

The printed delivery devices may be used sublingually, orally, within a food or beverage item, topically, etc., depending upon their configuration. For instance, printed delivery devices which are configured to dissolve/disperse easily may be used sublingually, whereas a printed delivery device which is configured to dissolve slowly may be used within a beverage item. The foregoing examples are in no way limiting, as slow dissolving/dispersing printed delivery devices may be used in a beverage and a fast dissolving/dispersing printed delivery device may be used orally.

The printed delivery device and components thereof, such as each layer and support substrate, can be any shape suitable for a desired application. For example, a printed delivery device can be in the form of a rectangular or square strip, sheets, a cube, a sphere, a disk, oval, stars, snowflakes, decorative designs, and the like.

The printed delivery device can vary in dimensions. Such variation in size may be dependent on application. In some embodiments, an individual layer may range in length or diameter from about 1 mm×1 mm to about 12 inches by 12 inches. Larger lengths or diameters are possible, for example, such as when the printed compositions are printed as sheets for large scale production, such as in food products or beverages. For instance, larger sizes for printed compositions may be utilized in large tea makers or large industrial coffee makers.

In some embodiments, an individual layer may range in thickness from about 2 microns to about 15 mils, or greater than 15 mils. For example, providing an appropriate dosage of vitamin D, such as 1,000 IU or more, an active layer may be about 3 microns in thickness and measuring about 2 mm×about 2 mm. In another example, Vitamin C or a protein may require a printed composition that is about 10 mils or more in thickness and measuring about 3 inches× about 3 inches in order to carry an efficacious dose, such as about 5 grams of the supplement. In some embodiments, the overall thickness of the printed composition may range from about 1 micron to about 50 mils. In some embodiments, the overall length or diameter of the printed composition may range from about 1 mm×about 1 mm to about 12 inches× about 12 inches. Larger lengths and diameters are also contemplated.

A printed delivery device can have multiple layers where one or more of the layers are different shapes. For example, a round support substrate may have one or more strip shaped active layers disposed thereon. In another example, the shapes of the printed delivery device may be tailored to meet a particular design need, such as a shape of the item that the printed composition will be included in, or to achieve a desired release profile.

The printed delivery device can be made using any number of printing techniques, for example, such as stencil printing, screen printing, rotary screen printing, flexography, offset gravure, ink jet, bubble jet, dry toner, ribbon transfer, powder coating, spray coating, roll coating, reverse roll coating, slot die coating, hot and/or cold laminating, knife coating, sintering, padding, curtain coating, and the like. In this regard, printing techniques are understood to cover coating techniques.

In some embodiments, a printing method using an ink, such as inks described herein, may be utilized to make the one or more layers of printed composition. The ink may be aqueous or solvent based. The ink may be ultraviolet (UV) curable, electron beam (EB) curable, thermally curable, cold curable, ambient catalyzed, ambient crosslinked, and the like. The ink may be edible and/or dissolvable based on the desired application. The ink may include the various components of the active layer, support substrate, and barrier layer discussed herein.

Figure 3:
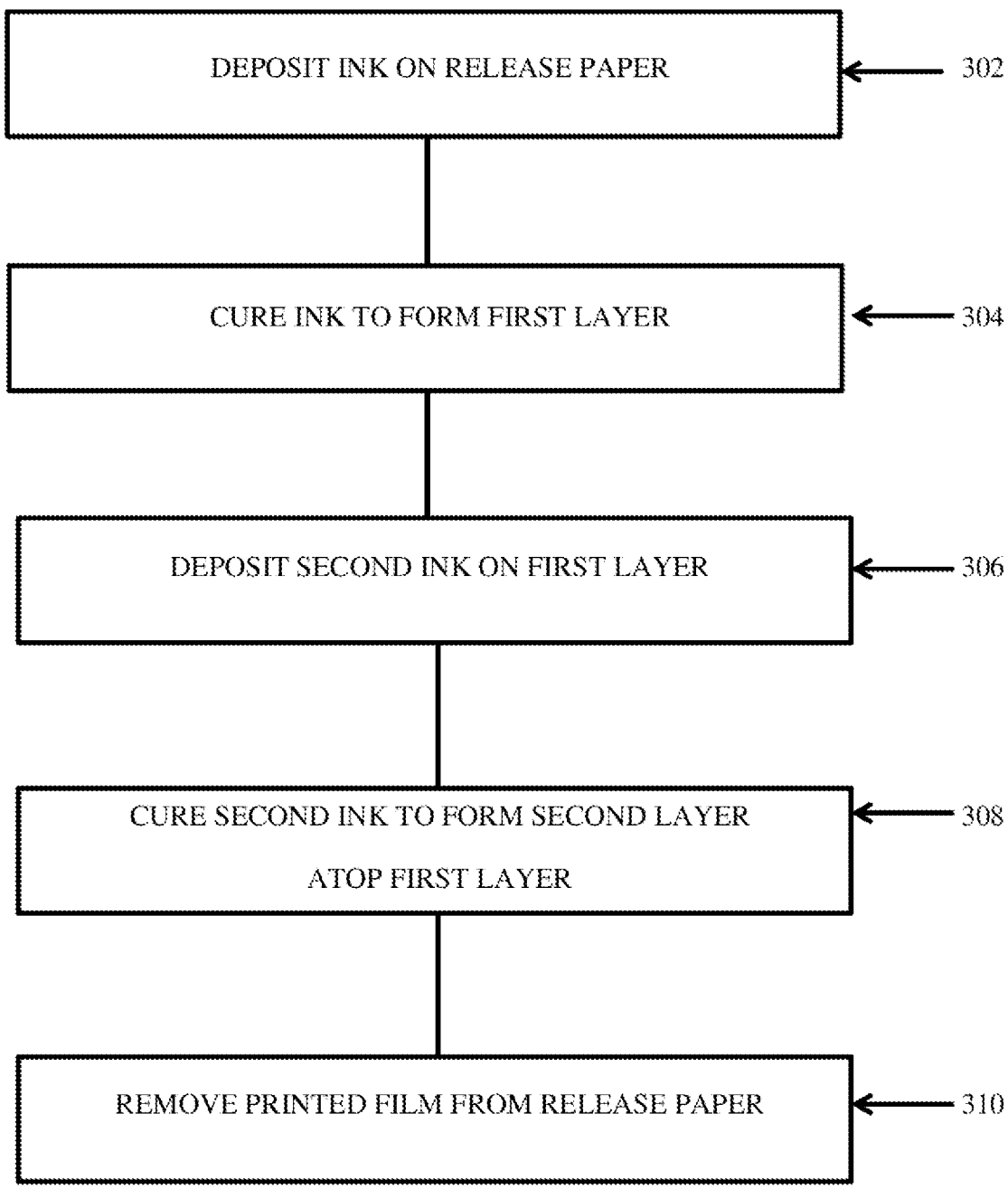
FIG. 3 depicts a flow chart for a method of making a printed delivery device in accordance with some embodiments of the present application.

The printing method may vary depending on the type of printed delivery device being made. FIG. 3 depicts a flow chart for a method 300 of making a printed composition in accordance with an embodiment of the present application. The method 300 is described concurrently with fabrication steps depicted in FIGS. 4A-E.

Figure 4A:
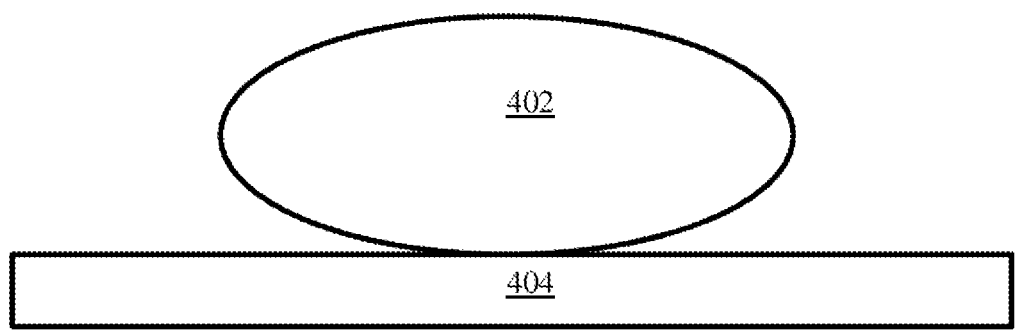
FIGS. 4A-E depict stages of fabrication a printed delivery device made in accordance with the method described in FIG. 3
Figure 4B:
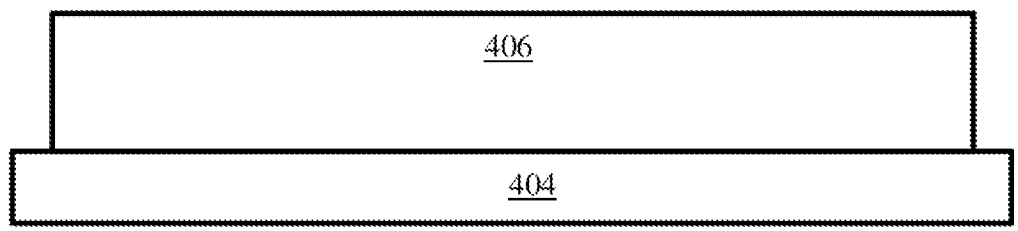
Figure 4C:
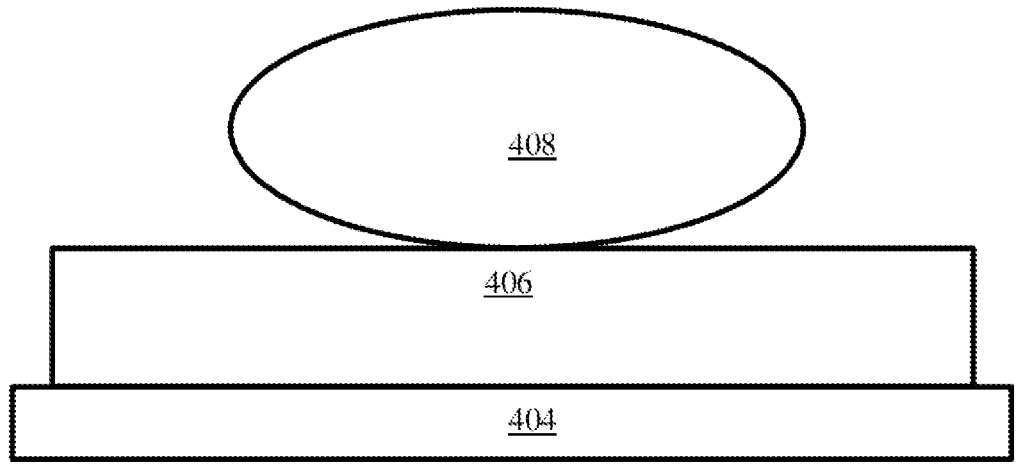
Figure 4D:
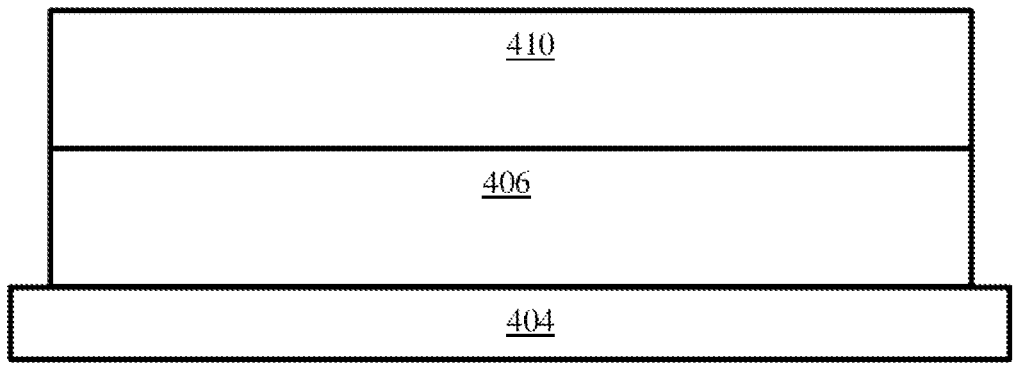
Figure 4E:
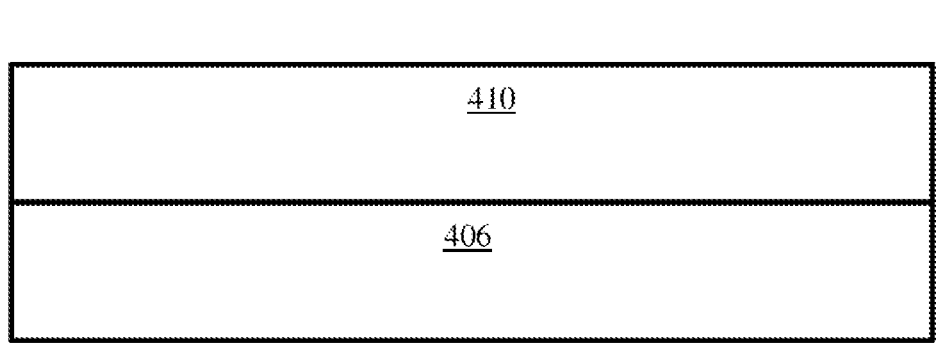

At 302, an ink 402 is deposited on a release paper 404 (shown in FIG. 4A). At 304, the ink 402 is cured to form a first layer 406 (shown in FIG. 4B). The first layer 406 may be an active layer or a support substrate, such as those described herein. Optionally, at 306, a second ink 408 is deposited atop the first layer 406 (shown in FIG. 4C). At 308, the second ink 408 is cured to form a second layer 410 (shown in FIG. 4D). The second layer may be an active layer, a barrier layer, or a support substrate, such as those described herein. Optionally, additional layers, such as active layers, inactive layers, or support substrates, may be added atop the second layer to achieve a desired printed composition. At 310, a finished printed composition 412 is removed from the release paper 404 (shown in FIG. 4E). Alternatively, the release paper 404 may itself be an exemplary support substrate and part of the printed composition.

Figure 5:
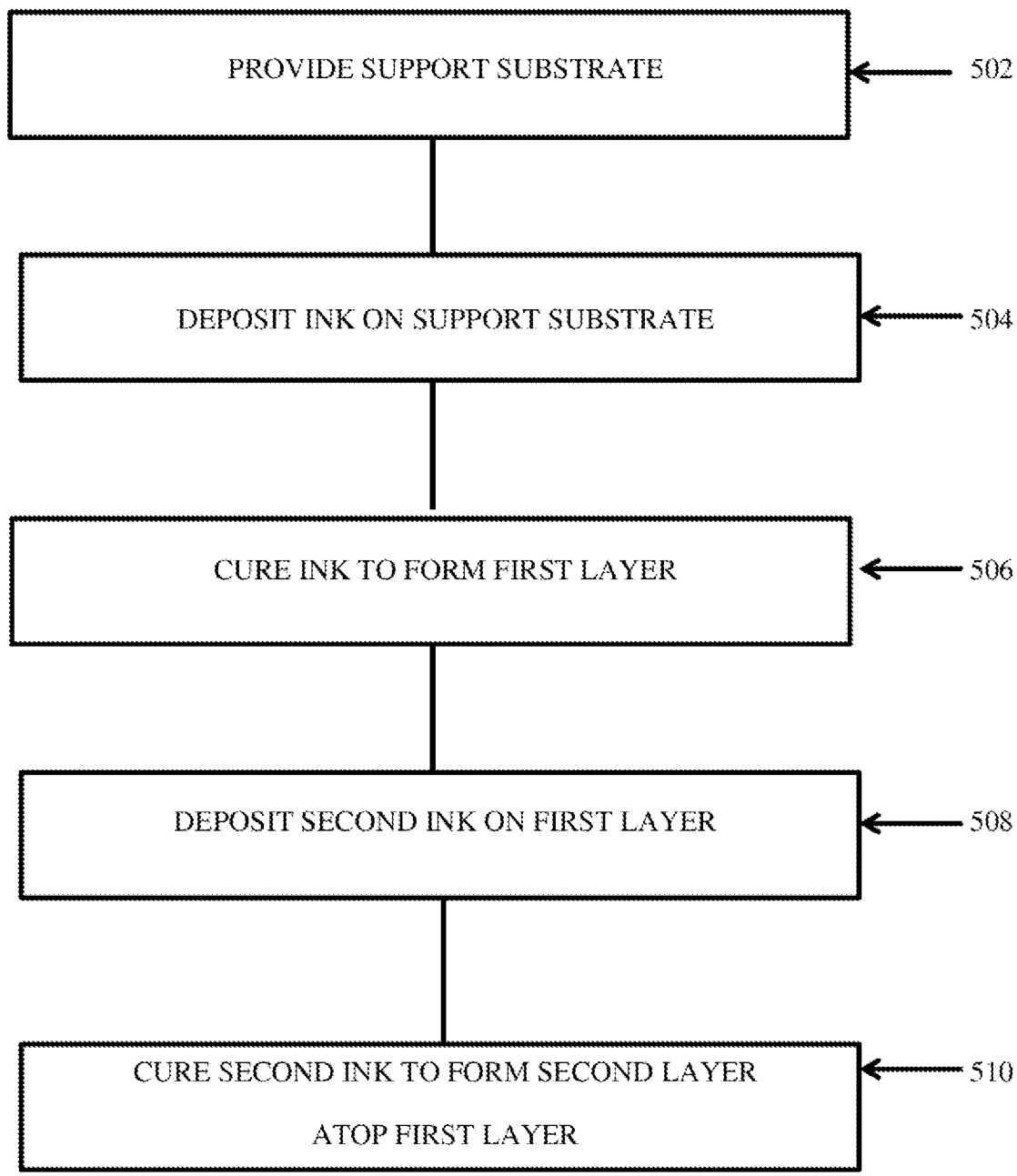
FIG. 5 depicts a flow chart for a method of making a printed delivery device composition in accordance with some embodiments of the present application.
Figure 6A:
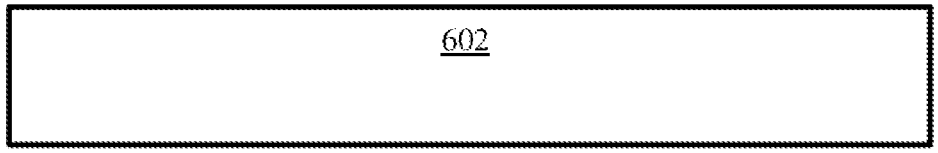
FIGS. 6A-E illustrate stages of fabrication of a printed delivery device in accordance with the method described in FIG. 5.
Figure 6B:
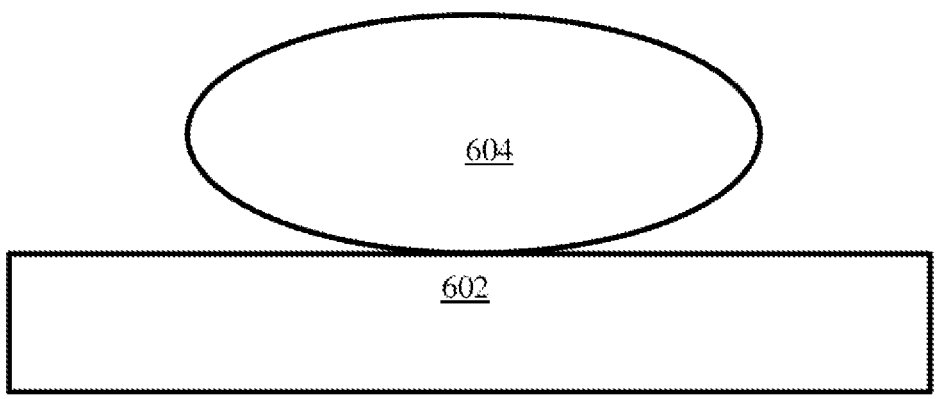
Figure 6C:
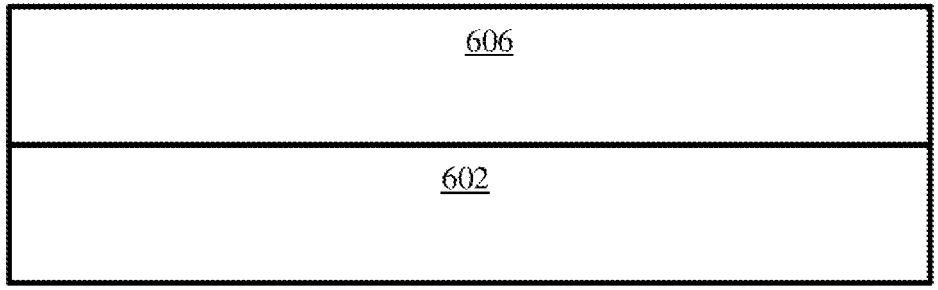
Figure 6D:
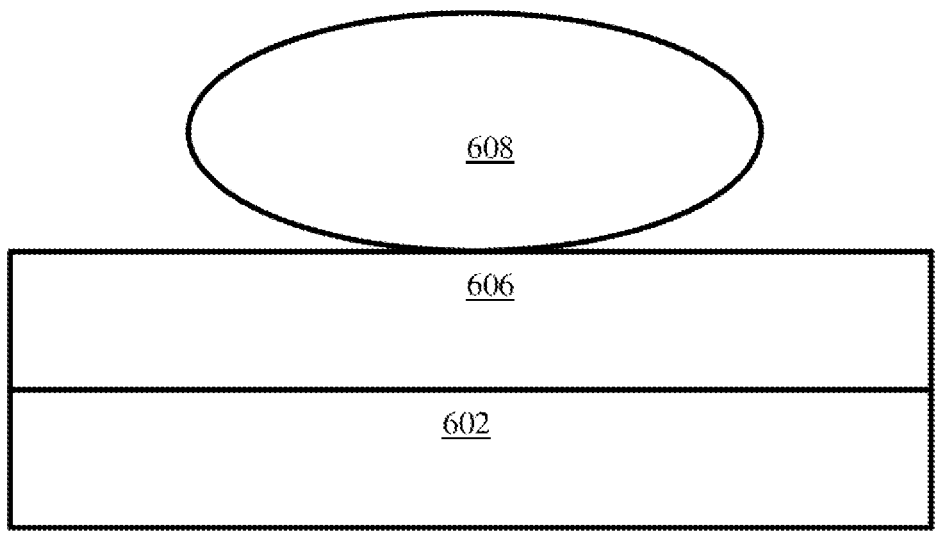
Figure 6E:
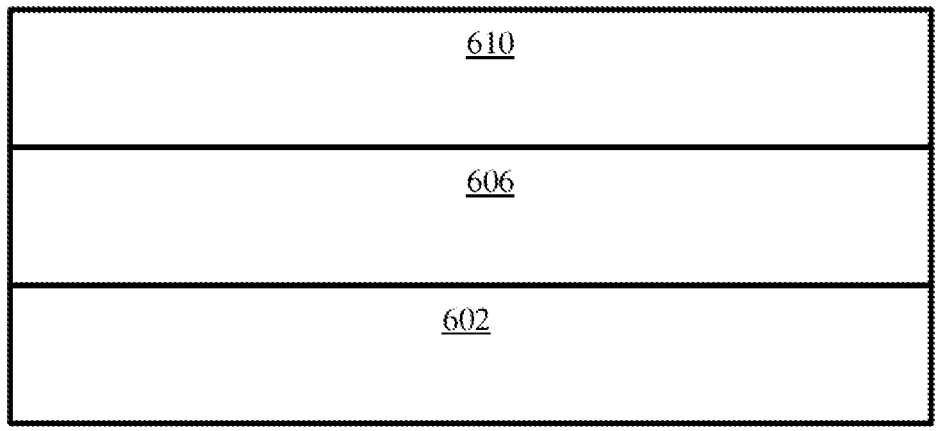

FIG. 5 depicts a flow chart for a method 500 of making a printed delivery device in accordance with an embodiment of the present application. The method is described concurrently with fabrication steps depicted in FIGS. 6A-E. At 502, a support substrate 602 is provided (shown in FIG. 6A). The support substrate 602 may be pre-manufactured by any suitable technique including printing and/or casting. At 504, an ink 604 is deposited on the support substrate 602 (shown in FIG. 6B). At 506, the ink 604 is cured to form a first layer 606 (shown in FIG. 6C), where the first layer may be an active layer or support substrate as discussed herein. At 508, a second ink 608 is deposited on the first layer 606 (shown in FIG. 6D). At 510, the second ink 608 is cured to form a second layer 610 (shown in FIG. 6E), where the second layer may be an active layer or a support substrate as discussed herein. Optionally, any suitable number of additional layers may be provided to form a printed composition.

In an example process of forming a printed delivery device, an ink containing a first supplement, such as a probiotic, may be knife coated onto a polyester support substrate. Additional layers, such as vitamins A and B, may each be screen printed, in a layered configuration on the first layer.

Figure 8:
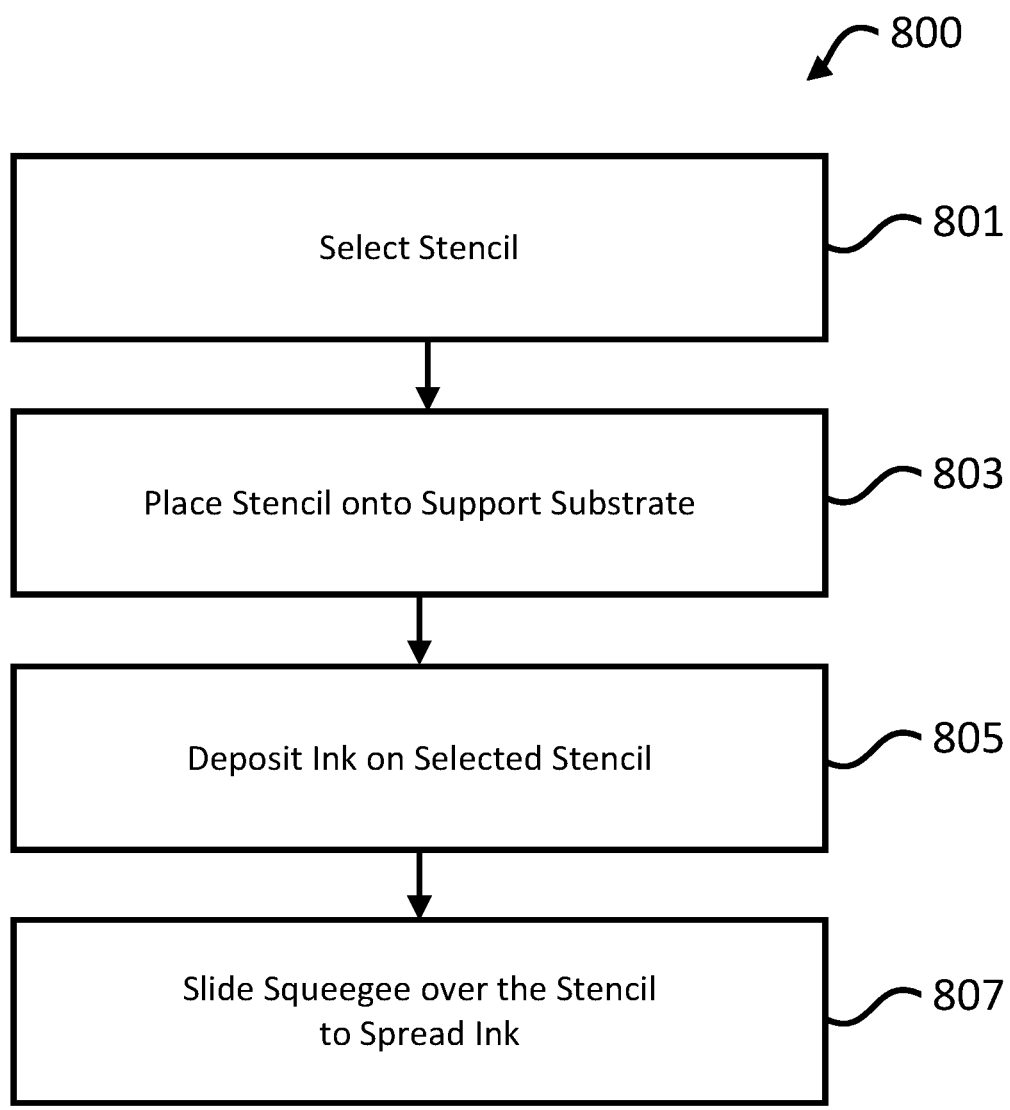
FIG. 8 illustrates a flow chart illustrating a process for stencil printing a delivery device in in accordance with some embodiments of the present application.

FIG. 8 illustrates a flow diagram for stencil printing an ink onto a support substrate. As illustrated by block 801, a stencil is selected. Then stencil is then placed on the support substrate, as illustrated by block 803. The ink may then be deposited onto the stencil, as illustrated by block 803 and a squeegee may be slid over the surface of the stencil to spread the ink into voids in the stencil, as illustrated by block 805.

The stencil may be constructed from stainless steel, or other materials, such as plastics, glass, other metals, etc. For instance, the stencil may be constructed from medical grade 316 stainless steel.

The thickness of the stencil may be selected based on the thickness of the layer to be printed. This is because the voids in the stencil are used to form the printed layer. In this regard, the ink that is deposited onto the stencil, as shown in block 803, is pulled into the voids by a squeegee sliding across the surface of the stencil, as illustrated by block 805. When hardened, the ink within each void forms a printed layer at or about the thickness of the stencil.

The thickness of the stencil may be dependent on the gauge of the stainless steel selected for the stencil. For instance, the stainless steel may be 24 gauge stainless steel that is $\frac{1}{40}$ of an inch thick. Higher or lower gauge stainless steel may also be selected for the stencil to achieve different thicknesses. For instance, a stencil made from 18 gauge stainless steel or 20 gauge stainless steel would be about $\frac{1}{20}$ or $\frac{3}{80}$ of an inch thick, respectively. A stencil made from 28 gauge stainless steel would be about $\frac{1}{64}$ of an inch thick.

Although the stencils herein are described as being formed from a single material, the stencil may include a combination of materials such as, for example, stainless steel and aluminum. Further, the thickness of a stencil may be varied. For instance, one section of the stencil may be $\frac{3}{80}$ of an inch and another portion $\frac{2}{80}$ of an inch.

Figure 9:
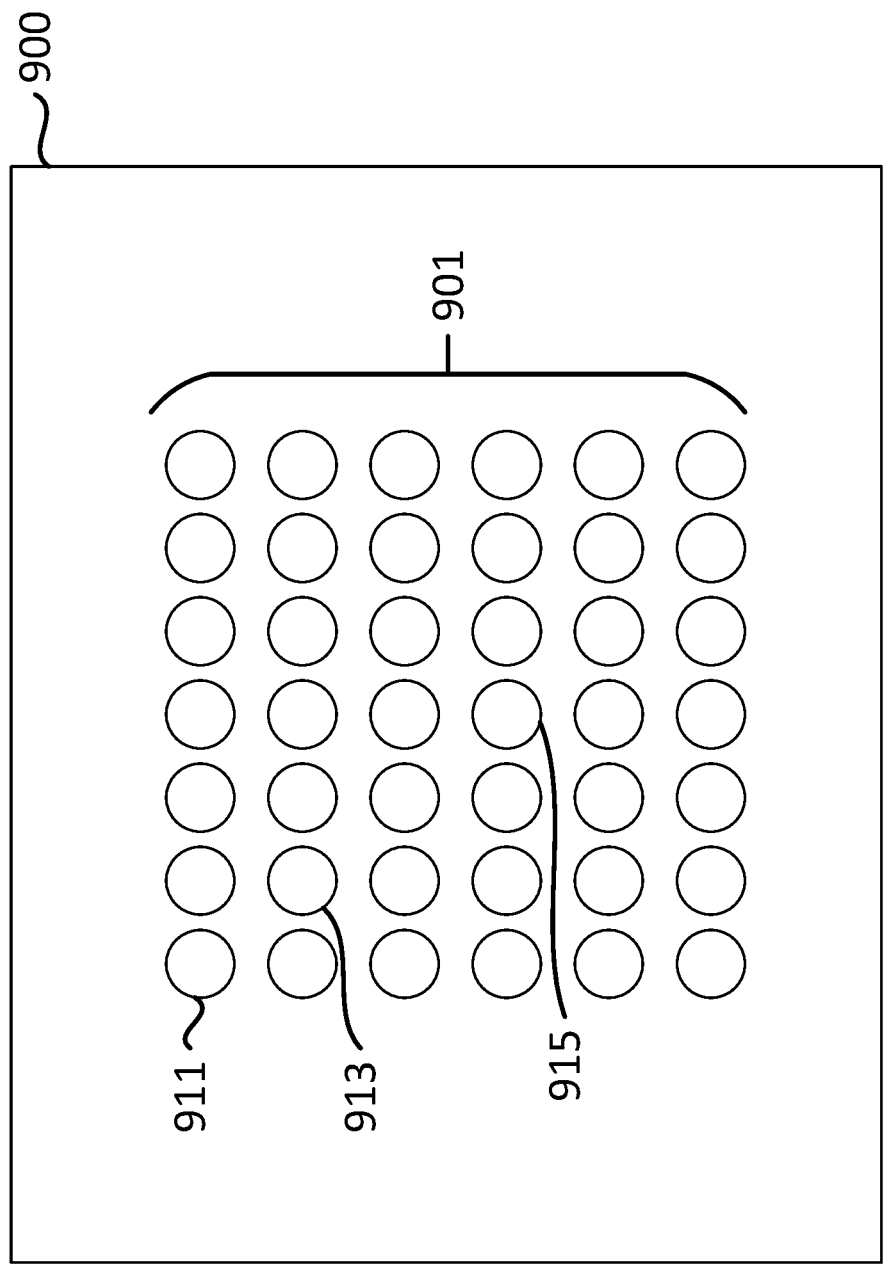
FIG. 9 illustrates a pattern of voids formed on a stencil in accordance with aspects of the present application.

Voids may be formed in the stencil. The voids formed in the stencil correspond to the locations where a printed layer will be formed. In this regard, the voids transverse the entirety of the material, thereby creating a void where the voids are present. FIG. 9 illustrates an example stencil 900 formed from 24 gauge stainless steel. The stencil 900 includes a set of voids 901 that create a 7×6 pattern in the stencil 900. During the printing of a layer using stencil 900, layers of ink will be formed on the support substrate under each hole of the set of voids, including voids 911, 913, 915, etc. Although FIG. 9 illustrates a 7×6 pattern of circular voids, the voids may be in any shape and any pattern. In some instances, the voids on a stencil may be different sizes and shapes.

Each stencil may be polished to allow the squeegee to slide evenly and smoothly across the surface. Moreover, the area where the voids meet the surface of the stencil may be rounded to reduce the possibility of chipping, or otherwise damaging the squeegee when the squeegee passes over the void.

Figure 10A:
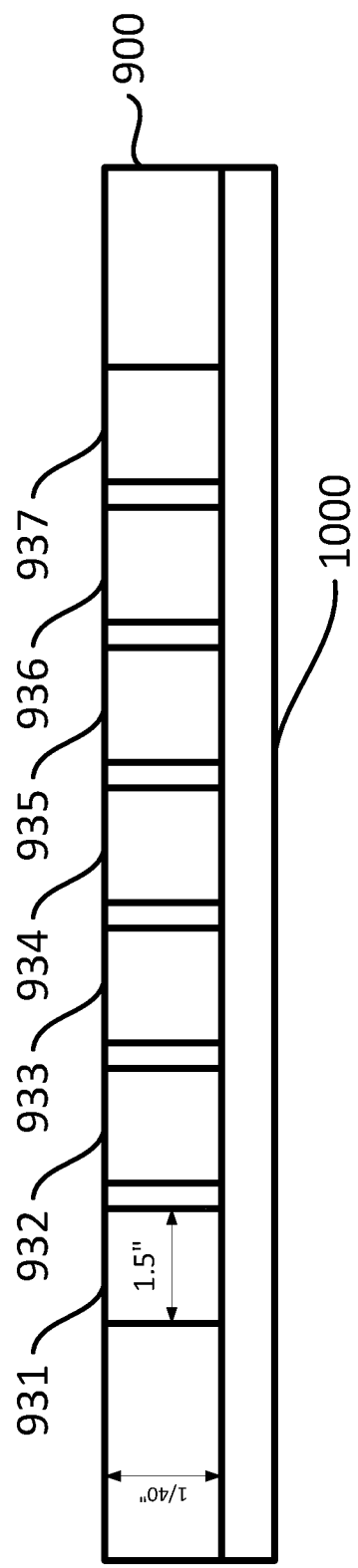
FIGS. 10A-10C show an exploded side, cutaway view of a stencil during the printing of a layer in accordance with aspects of the present application.
Figure 10B:
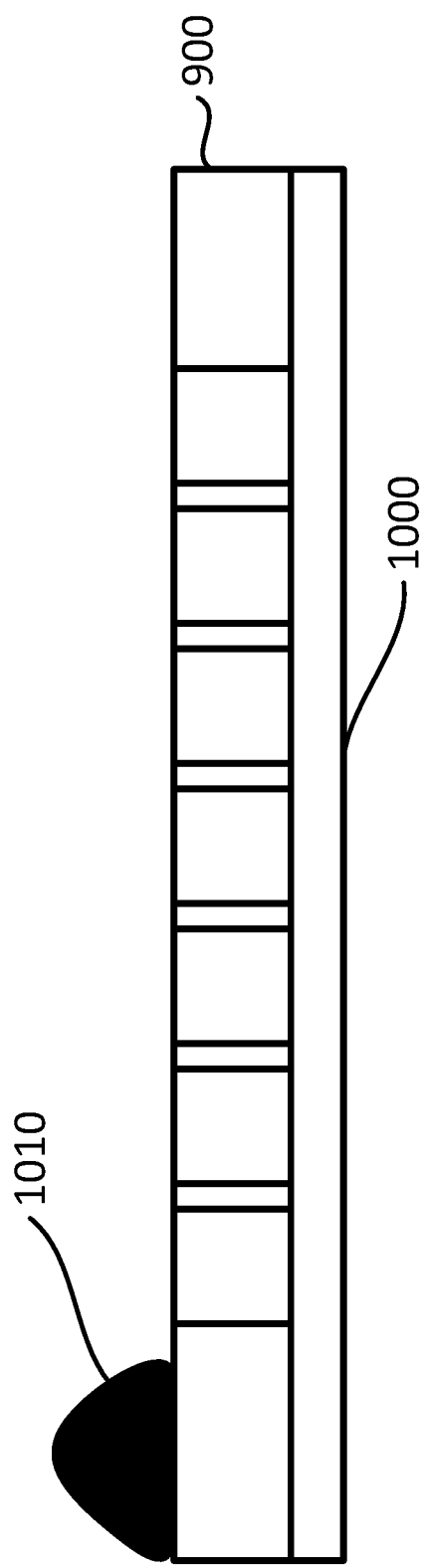
Figure 10C:
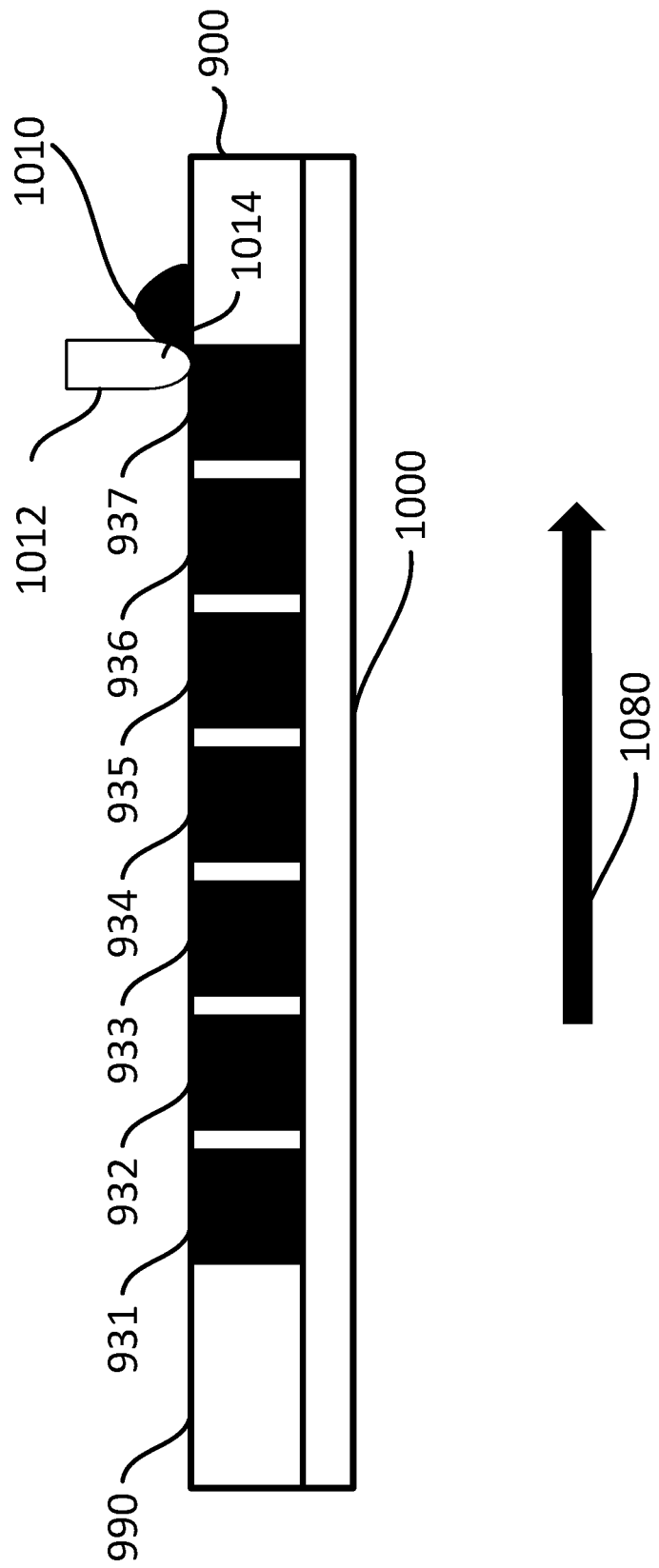

FIGS. 10A-10C show an exploded side, cutaway view of a stencil 900 during the printing of a layer. As shown in FIG. 10A, stencil 900 includes voids 931-937. Each void is 1.5" in diameter. The stencil 900 is constructed from 24 gauge medical grade 316 stainless steel, and is thus, $\frac{1}{40}$ of an inch thick. Consistent with block 803, the stencil 900 is positioned over a support substrate 1000.

FIG. 10B illustrates an ink 1010 being deposited onto the stencil 900, consistent with block 805 of FIG. 8. FIG. 10C illustrates a squeegee 1012 being moved along the surface 990 of stencil 900 in the direction illustrated by arrow 1080. As the squeegee moves along the surface 990, the ink 1010 fills the voids 931-937. The tip 1014 of the squeegee is shown as having a rounded edge, referred to as a bullnose. Alternatively, the squeegee may have other edges, such as a straight edge. The tip 1014 of the squeegee may be made of 60, 70, or 80 durometer polyurethane. The polyurethane may be medical grade and FDA approved.

The printed layers of ink may be heated in an oven after being printed. For instance, the substrate 1000 and printed layers of ink may be placed on a tray and inserted into a batch oven where the substrate and printed layers of ink may be heated. In another example, the substrate and printed layers of ink may be placed on a conveyor of a conveyor oven. The substrate 1000 and printed layers of ink may then be moved on the conveyor through the conveyor oven where they may be heated. In each example, the substrate 1000 and printed layers of ink may be heated between 30 seconds to 15 minutes in heat ranging from 100-350 F, but preferably between 1 minute and 10 minutes in heat ranging from 150-300 F, and more preferably between 2-5 minutes between 200-250 F.

Figure 11:
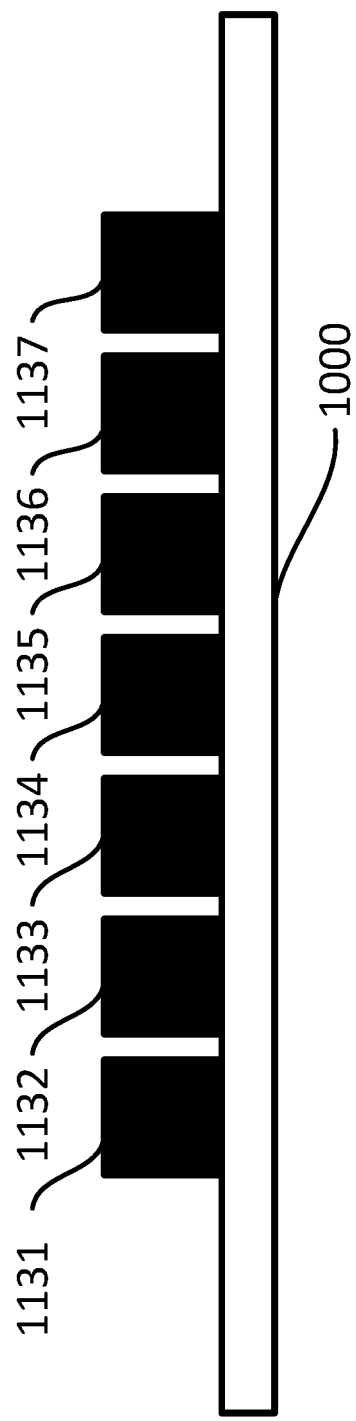
FIG. 11 illustrates the layers on the substrate after removal of the stencil in accordance with aspects of the present disclosure.

FIG. 11 illustrates the layers 1131-1137 that remain on the substrate after the stencil 900 is removed from the substrate. The stencil 900 may be removed before or after heating of the layers 1131-1137. At this stage in production, additional layers may be printed on to the layers 1131-1137 by placing additional stencils over the layers and printing new layers onto the existing layers. Additionally, or alternatively, the layers may be removed from the substrate manually or through use of a robot. The removed layers may each be considered a printed delivery device. In other embodiments the layers may not be removed from the substrate. Rather, the substrate may be cut such that each cut portion includes one or more layers.

The printed delivery devices may be packaged into an unsealed package. The package may then be sealed. In some instances, the package may be flushed with Argon, nitrogen, or other such gas to displace the oxygen within the package, resulting in an oxygen free environment. By doing so, the printed delivery device will not be subjected to oxygen that may cause oxidation.

As can be seen in FIG. 10C, stencil printing is a form of continuous printing and is not a printing that is done with ink droplets, such as with ink-jet printing. By stencil printing layers, more viscous ink may be used than can be used with some other types of printing, such as ink-jet printing. In this regard, the ink used for stencil printing may range from having a 500 centipoise (CPS) to over 5000 cps depending upon the formulation of the ink. Such inks would have too high of a viscosity to go through an ink jet head, which typically require inks to have between 2-8 cps. Further, the amount of solids used in an ink that can be stencil printed could be between 40% and 90% solids, or preferably between 50% and 80% solids. In contrast, the solids in an ink for ink jet printing are 30% or less. As the amount of solids that can be included in stencil printing is greater than in ink jet printing, more active ingredients, such as supplements or pharmaceuticals, may be included within a single stencil printed delivery layer than in an ink jet printed layer.

The resulting size of the printed delivery device is dependent on the size of the layers (width and thickness) and the formulation of ink used to create the layers. Typically, the printed delivery device can weigh between 100 mg to over 3 grams. For example, to get a printed delivery device with a 200 mg weight, an ink having 50% solids may be used to form a layer in a stencil made from 24 gauge stainless steel that has a void of 1.5". To get higher deposition translating to a heavier printed delivery device, a lower gauge material, such as 20 or 18 gauge stainless steel may be used. With a 1.5" void the 20 gauge steel would yield around a 300 mg printed delivery device and the 18 gauge steel would yield around a 400 mg printed delivery device. If the level of solids in the ink was raised 50% up to 75%, the same 20 and 18 gauge steel would yield closer to 400 mg and 500 mg printed delivery devices, respectively.

In contrast to stencil printing, ink jet printers print approximately 100 micron droplets to make their pattern. It is not one continuous film, as occurs with stencil printing. Moreover, the particles within a 100 micron droplet have to be less than 50 microns to go through the head of the ink jet printer, and the particles are typically below 5 microns. In contrast, the particle size of the ingredients within the stencil printing ink can range from 10 microns to greater than 200 microns. Thus, it would take numerous passes of an ink jet to deposit a similar amount of active ingredient that can be deposited in a single layer by stencil printing.

Another possible printing technique is flexography. In flexography printing, a very thin (e.g., low viscosity) ink is required. Thus, it would take a number of printings to equal a 24 gauge stencil printed layer. The number of printing would be dependent on the amount of solids within the ink and the type of anilox (i.e., roller,) that is used to apply the ink. As flexography uses a roller, small and detailed layers would not be practical.

A flexo printed decorative film may be applied to a polyester release coating. The polyester release coating may then be overlaid on a portion, or all of the, printed delivery device. The flexo printed decorative film may then be laminated, through hot or cold lamination, to the printed delivery device.

In some instances, decorative designs or other such indicia, such as words, pictures, etc., may be printed onto the printed delivery device. In this regard, indicia may include the identification codes, such as spatial codes, QR codes, bar codes, identification numbers, or other such indicia which can be used to identifying, track, and/or provide information. These indicia and decorative designs may be ink-jet or flexo printed directly onto the printed delivery device.

A design/indicia may also be printed directly onto the support substrate or layer. For example, a decorative layer may be ink-jet printed onto the support substrate and/or layer(s) using an edible ink. Although the example provides for ink-jet printing of the design/indicia, any other printing techniques may be used, such as screening printing, rotary screen printing, flexography, offset gravure, ink jet, bubble jet, dry toner, ribbon transfer, powder coating, spray coating, roll coating, reverse roll coating, slot die coating, hot and/or cold laminating, knife coating, sintering, padding, curtain coating, and the like. In this regard, printing techniques are understood to cover coating techniques.

Each layer of the printed delivery device may have a natural colorant added, such as turmeric, beet root, etc.

The printed delivery device may be used in various applications that may benefit from a supplement. For example, the printed delivery device may be added to a food or beverage, such as a cake mix, a muffin mix, a cupcake mix, a tea bag, a coffee pod, ground coffee, coffee beans which are then ground, powdered chocolate mixes, powdered soup mixes, gelatin mixes, concentrates, such as almond milk concentrate, soybean concentrate, macadamia nut concentrate, and the like. In one example, as the tea in a tea bag and/or coffee in a coffee pod is made using water, a supplement from the printed composition within the tea bag and/or coffee pod, can be released in the tea and/or coffee. In this instance, a supplement may be a sweetener. Other supplements may include a vitamin, mineral, or the like.

In some instances, a printed delivery device can include layers which are printed from inks having various concentrations of food, cleaners, fertilizers, or other such products. For instance, the ink may include an edible concentrate such as almond milk concentrate, soybean concentrate, macadamia nut concentrate, apple juice concentrate, and the like. In some instances the inks may include cleaning concentrates such as concentrated soap. In some instances, the ink may include concentrates of fertilizer. By incorporating the concentrates into the printed delivery device, shipping costs may be saved as there may be no need for refrigeration. Additionally, absence of liquid reduces the weight of the shipped product.

In some instances, a printed composition can include multiple supplements that release at different times, such as a vitamin and a probiotic. For example, the printed composition may be tailored such that the vitamin dissolves first in the stomach, but the probiotic is slower to dissolve until it reaches the intestines.

Figure 7:
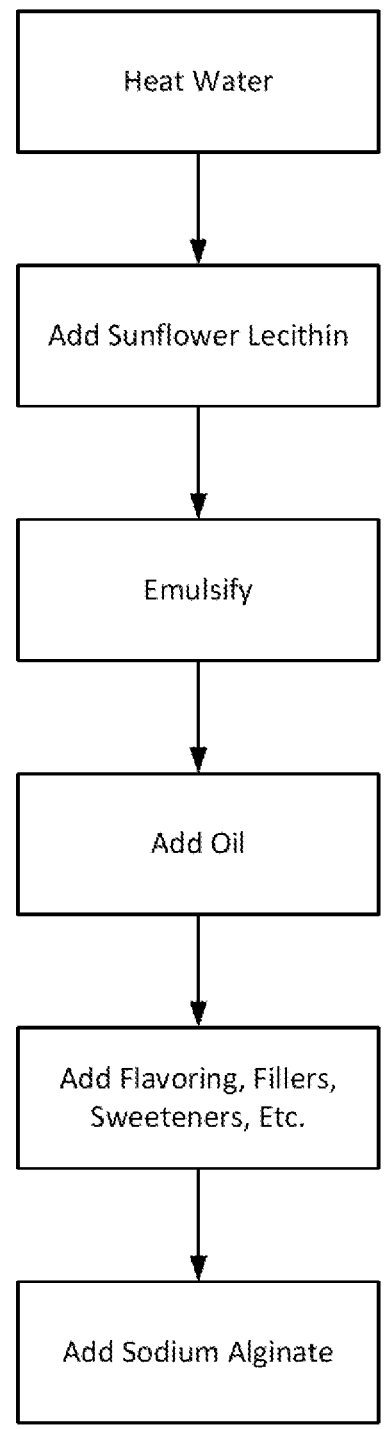
FIG. 7 depicts a formation of an ink in accordance with some embodiments of the present application.

An example method of forming an ink for printing a layer of the printed composition having oil is shown in FIG. 7. As shown in block 701, water, comprising 56% of the overall composition of the ink, or more or less, may be heated to 140 degrees Fahrenheit. Sunflower lecithin, comprising 4%, or more or less, of the overall composition of the ink, may be added to the heated water, as shown in block 702. The sunflower lecithin and water may be mixed to form an emulsification, as shown in block 703. The oil, such as THC, CBD, Hemp oil, or other oils, having 10%, or more or less of the overall composition of the ink, may be added to the emulsification, as shown in block 704. As shown in block 705, flavorings, sweeteners, viscosity modifiers, or other such fillers, such as cluster dextrin, cyclodextrin, malto dextrin, etc., comprising 27%, or more or less, of the overall composition of the ink, may be added to the emulsification. Finally, as shown in block 706, sodium alginate, comprising 3%, or more or less, of the overall composition of the ink, may be added to the emulsification.

Additional formulations of ink, which may preferably be applied via stencil printing, are included in the following tables (Tables 1-10). For each ingredient, the value is provided as percent total weight per 100 grams of the formulation (e.g., "30-40%" is between 30-40% total weight of the formulation.)

TABLE 1

| Description | Rebulk |
|---|---|
| Purified Water | Between 30-40%, preferably between 32-38%, more preferably between 33-37% |
| Pullulan | Between 5-15%, preferably between 7-13%, more preferably between 8-12% |
| Vegetable Glycerin | Between 5-15%, preferably between 7-13%, more preferably between 8-12% |
| Milk Powder (e.g., oat, dairy, almond, soy, etc.) | Between 35-55%, preferably between 40-50%, more preferably between 42-48% |
| Total | 100.00 |

TABLE 2

| Description | Rebulk |
|---|---|
| Purified Water | Between 30-40%, preferably between 32-38%, more preferably between 33-37% |
| Sunflower Lecithin | Between 1-7%, preferably between 2-6% |
| Hazelnut | Between 15-35%, preferably between 18-32%, more preferably between 23-27% |
| Cluster Dextrin | Between 3-12%, preferably between 5-9% |
| Sucralose | Between 0-5%, preferably between 0.5-3% |
| Vegetable Glycerin | Between 3-12%, preferably between 5-9% |
| Stevia | Between 3-12%, preferably between 5-9% |
| Cyclodextrin | Between 5-15%, preferably between 8-12% |
| Sodium Algaenate | Between 0-5%, preferably between 2-4% |
| Total | 100.00 |

TABLE 3

| Description | Rebulk |
|---|---|
| Purified Water | Between 25-75%, preferably between 35-65%, more preferably between 45-55% |
| Sunflower Lecithin | Between 1-7%, preferably between 2-6% |
| Cluster Dextrin | Between 3-12%, preferably between 5-9% |
| Vegetable Glycerin | Between 3-12%, preferably between 5-9% |
| Sucralose | Between 0-7%, preferably between 1-5%, more preferably between 1-4% |
| Stevia | Between 5-30%, preferably between 10-20% |
| Cyclodextrin | Between 5-15%, preferably between 8-12% |
| Sodium Algaenate | Between 0-5%, preferably between 2-4% |
| Total | 100.00 |

TABLE 4

| Description | Rebulk |
|---|---|
| Purified Water | Between 25-75%, preferably between 35-65%, more preferably between 45-55% |
| Sunflower Lecithin | Between 0-7%, preferably between 0-5%, more preferably between 0-3% |
| Pullulan | Between 0-7%, preferably between 0-5%, more preferably between 1-4% |
| Stevia | Between 0-10%, preferably between 2-8%, more preferably between 3-7% |
| Tapioca Starch | Between 15-35%, preferably between 20-30%, more preferably between 22-28% |
| Cellulose Fiber | Between 0-7%, preferably between 0-5%, more preferably between 1-4% |
| Vegetable Glycerin | Between 0-10%, preferably between 2-8%, more preferably between 3-7% |
| Cane Sugar | Between 3-12%, preferably between 5-9% |
| Total | 100.00 |

TABLE 5

| Description | Rebulk |
|---|---|
| Purified Water | Between 25-75%, preferably between 35-65%, more preferably between 45-55% |
| Pullulan | Between 0-7%, preferably between 0-5%, more preferably between 1-4% |
| Sodium Algaenate | Between 0-7%, preferably between 0-5%, more preferably between 1-4% |
| Cluster Dextrin | Between 5-30%, preferably between 10-20% |
| Stevia | Between 5-15%, preferably between 8-13% |
| Sucralose | Between 0-10%, preferably between 1-8%, more preferably between 2-5% |
| Vanilla | Between 0-15%, preferably between 3-10% more preferably between 3-8% |

TABLE 5-continued

| Description | Rebulk |
| --- | --- |
| Vegetable Glycerin | Between 3-20%, preferably between 5-15%, more preferably between 6-12% |
| Total | 100.00 |

TABLE 6

| Description | Rebulk |
| --- | --- |
| Purified Water | Between 25-75%, preferably between 35-65%, more preferably between 45-55% |
| Pullulan | Between 0-7%, preferably between 1-5%, more preferably between 1-4% |
| Sodium Algaenate | Between 0-5%, preferably between 0.5-3% |
| Cluster Dextrin | Between 5-30%, preferably between 10-20% |
| Stevia | Between 5-15%, preferably between 8-13% |
| Sucralose | Between 0-10%, preferably between 1-8%, more preferably between 2-5% |
| French Vanilla | Between 0-15%, preferably between 3-10%, more preferably between 3-8% |
| Vegetable Glycerin | Between 3-20%, preferably between 5-15%, more preferably between 6-12% |
| Total | 100.00 |

TABLE 7

| Description | Rebulk |
| --- | --- |
| Purified Water | Between 15-55%, preferably between 25-45%, more preferably between 30-40% |
| Pullulan | Between 0-7%, preferably between 0-5%, more preferably between 1-4% |
| Xylitol | Between 0-15%, preferably between 3-10%, more preferably between 3-8% |
| Tapioca Starch | Between 15-55%, preferably between 25-45%, more preferably between 30-40% |
| Cluster Dextrin | Between 0-10%, preferably between 1-8%, more preferably between 2-5% |
| Vegetable Glycerin | Between 0-15%, preferably between 3-10%, more preferably between 3-8% |
| Sunflower Lecithin | Between 0-7%, preferably between 0-5%, more preferably between 0-3% |
| Pure Cane Sugar | Between 0-15%, preferably between 3-10%, more preferably between 3-8% |
| D3 Oil Powdered | Between 0-10%, preferably between 1-8%, more preferably between 2-5% |
| Total | 100.00 |

TABLE 8

| Description | Rebulk |
| --- | --- |
| Purified Water | Between 40-70%, preferably between 45-65%, more preferably between 50-60% |
| Disodium Phosphate | Between 0-10%, preferably between 1-8%, more preferably between 2-5% |
| Meriva | Between 5-30%, preferably between 10-20% |
| Oat Fiber | Between 5-30%, preferably between 10-20% |
| Foamex | Between 0-10%, preferably between 1-8%, more preferably between 3-6% |
| Vegetable Glycerin | Between 0-5%, preferably between 2-4% |
| Total | 100.00 |

TABLET

| Description | Rebulk |
| --- | --- |
| Purified Water | Between 25-75%, preferably between 35-65%, more preferably between 45-55% |
| Organic Milk (e.g., almond, soy, oat, dairy, coconut, etc.) | Between 0-5%, preferably between 0.25-3%, more preferably between 0.25-2% |
| Pullulan | Between 0-10%, preferably between 1-8%, more preferably between 3-5% |
| Xylitol | Between 3-13%, preferably between 5-11% |
| Tapioca Starch | Between 5-30%, preferably between 10-20% |
| Oat Fiber | Between 3-12%, preferably between 5-9% |
| Vegetable Glycerin | Between 3-12%, preferably between 5-9% |
| Foamex | Between 3-12%, preferably between 5-9% |
| Total | 100.00 |

TABLE 10

| Description | Rebulk |
| --- | --- |
| Purified Water | Between 25-75%, preferably between 35-65%, more preferably between 45-55% |
| Organic Milk (e.g., almond, soy, oat, dairy, coconut, etc.) | Between 0-5%, preferably between 0-3%, more preferably between 0.25-2% |
| Pullulan | Between 0-10%, preferably between 1-8%, more preferably between 2-5% |
| Xylitol | Between 0-15%, preferably between 3-12%, more preferably between 5-9% |
| Tapioca Starch | Between 5-30%, preferably between 10-20% |
| Oat Fiber | Between 0-15%, preferably between 3-12%, more preferably between 5-9% |
| Vegetable Glycerin | Between 0-15%, preferably between 3-10%, more preferably between 3-8% |
| Foamex | Between 0-15%, preferably between 3-10%, more preferably between 3-8% |
| Colorant | Between 0-7%, preferably between 0-5%, more preferably between 0.5-3% |
| Total | 100.00 |

The ingredients listed in each of the above formulations are merely example ingredients. In this regard, listed ingredients may be substituted with like ingredients. For instance stevia may be substituted with another sweetener, such as cane sugar.

It will be understood by those skilled in the art that, although the subject invention has been described above in relation to embodiments thereof variations and modifications can be effected in these preferred embodiments without departing from the scope and spirit of the invention.

Unless otherwise stated, the foregoing, alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A printed delivery device, comprising: a first layer formed from a water-soluble, printable composition, the water-soluble, printable composition including between 25-55% purified water by weight, between 1-10% pullulan by weight, 2-12% vegetable glycerin by weight, and 35-48% milk powder by weight, wherein the first layer is formed by at least one of the following techniques: stencil printing, screen printing, rotary screen printing, flexography, offset gravure, ink jet printing, bubble jet printing, dry toner printing, ribbon transfer printing, powder coating, spray coating, roll coating, reverse roll coating, slot die coating, hot laminating, cold laminating, knife coating, sintering, padding, or curtain coating.

2. The printed delivery device of claim 1, wherein the water-soluble, printable composition further includes between 35-45% milk powder by weight.

3. The printed delivery device of claim 1, wherein the water-soluble, printable composition further includes between 3-12% cane sugar by weight, between 1-4% cellulose fiber by weight, between 20-30% tapioca starch, by weight, between 2-8% stevia by weight, and between 0.25-3% sunflower lecithin by weight.

4. The printed delivery device of claim 1, wherein the water-soluble, printable composition further includes between 1-4% sodium alginate by weight, between 10-20% cluster dextrin by weight, between 5-15% stevia by weight, between 2-5% sucralose by weight, and between 3-10% vanilla by weight.

5. The printed delivery device of claim 1, wherein the water-soluble, printable composition further includes between 1-3% sodium alginate by weight, between 10-20% cluster dextrin by weight, between 5-15% stevia by weight, between 2-5% sucralose by weight, and between 3-8% French vanilla by weight.

6. The printed delivery device of claim 1, wherein the water-soluble, printable composition further includes between 3-10% xylitol by weight, between 1-8% cluster dextrin by weight, between 25-45% tapioca starch by weight, between 0.25-3% sunflower lecithin by weight, between 3-8% cane sugar by weight, and between 2-5% vitamin D3 powdered oil by weight.

7. The printed delivery device of claim 1, wherein the water-soluble, printable composition further includes between 0.25-2% milk by weight, between 5-11% xylitol by weight, between 10-20% tapioca starch by weight, between 5-9% oat fiber by weight, and between 5-9% defoamer by weight.

8. The printed delivery device of claim 1, wherein the water-soluble, printable composition further includes between 0.25-2% milk by weight, between 5-11% xylitol by weight, between 10-20% tapioca starch by weight, between 5-9% oat fiber by weight, between 5-9% defoamer by weight, and between 0-5% colorant by weight.

9. The printed delivery device of claim 1, further comprising:
a second layer formed of a second printable composition including at least one second supplement or pharmaceutical.

10. The printed delivery device of claim 9, wherein the second layer is formed on the first layer.

11. The printed delivery device of claim 1, further comprising a support substrate.

12. The printed delivery device of claim 11, wherein the support substrate comprises polyester, polyolefin, or a combination of polyester and polyolefin.

13. The printed delivery device of claim 11, wherein the support substrate is dissolvable in a liquid.

14. The printed delivery device of claim 11, wherein the first layer is printed on the support substrate.

15. The printed delivery device of claim 11, wherein the support substrate and the first layer are uniform in size.

16. The printed delivery device of claim 1, wherein the first layer includes micro-scoring or pinholes.

17. The printed delivery device of claim 1, wherein the water-soluble, printable composition further includes one or more of a vitamin, mineral, protein, probiotic, fiber, amino acid, CBD oil, THC oil, or hemp oil.

18. The printed delivery device of claim 1, wherein the water-soluble, printable composition further includes a binder, wherein the binder includes one or more of a polysaccharide, ethyl cellulose, polyacrylic acid, methyl cellulose, polyethylene oxide, guar gum, xanthum gum, gum Arabic, polyvinyl alcohol, sodium alginate, water-soluble hydroxypropylmethyl cellulose, hydroxyethyl cellulose, hydroxypropyl cellulose, polyvinyl pyrrolidone, carboxymethyl cellulose, sodium carboxy methyl cellulose, methyl cellulose, polyvinyl alcohol, xanthum gum, corn starch, or rice starch.

19. The printed delivery device of claim 1, wherein the water-soluble, printable composition further includes a flow aid, wherein the flow aid is one or more of glycols, polyglycols, xylitol, or glycerol.

20. A printed delivery device, comprising: a first layer formed from a water-soluble, printable composition, the water-soluble, printable composition including between 25-55% purified water by weight, between 1-10% pullulan by weight, 2-12% vegetable glycerin by weight, and 35-48% milk powder by weight; and a support substrate, wherein; the first layer is formed on the support substrate; and the first layer is formed by at least one of the following techniques: stencil printing, screen printing, rotary screen printing, flexography, offset gravure, ink jet printing, bubble jet printing, dry toner printing, ribbon transfer printing, powder coating, spray coating, roll coating, reverse roll coating, slot die coating, hot laminating, cold laminating, knife coating, sintering, padding, or curtain coating.

* * * * *